(12) United States Patent
Dokic et al.

(10) Patent No.: US 10,648,369 B2
(45) Date of Patent: May 12, 2020

(54) MODULAR COOLING WATER ASSEMBLIES FOR COMBINED CYCLE POWER PLANT SYSTEMS

(71) Applicant: General Electric Company, Schenectady, NY (US)

(72) Inventors: Borislav Dokic, Nussbaumen (CH); Aleksandar Naskovic, Nussbaumen (CH)

(73) Assignee: General Electric Company, Schenectady, NY (US)

( * ) Notice: Subject to any disclaimer, the term of this patent is extended or adjusted under 35 U.S.C. 154(b) by 19 days.

(21) Appl. No.: 16/017,138

(22) Filed: Jun. 25, 2018

(65) Prior Publication Data

US 2019/0390574 A1    Dec. 26, 2019

(51) Int. Cl.
*F01P 3/00* (2006.01)
*F01K 9/00* (2006.01)
*F01K 23/10* (2006.01)
*F01K 7/16* (2006.01)

(52) U.S. Cl.
CPC ............... *F01K 9/003* (2013.01); *F01K 7/16* (2013.01); *F01K 23/10* (2013.01); F05D 2220/31 (2013.01); F05D 2260/232 (2013.01)

(58) Field of Classification Search
CPC ... F28D 7/06; B01D 53/1418; B01D 53/1475; F01K 25/08; F01K 9/003; F01K 7/16; F01K 23/10; F05D 2220/31; F05D 2260/232
USPC .......................................................... 165/51
See application file for complete search history.

(56) References Cited

U.S. PATENT DOCUMENTS

| | | | |
|---|---|---|---|
| 4,116,267 A | 9/1978 | Jacobs | |
| 2008/0264612 A1* | 10/2008 | Pellikka | F28D 7/06 165/104.28 |
| 2013/0119667 A1* | 5/2013 | Christensen | B01D 53/1475 290/52 |
| 2013/0133327 A1* | 5/2013 | Milam | F01K 25/08 60/651 |
| 2013/0205796 A1* | 8/2013 | Christensen | B01D 53/1418 60/772 |
| 2014/0076520 A1 | 3/2014 | Lu et al. | |
| 2016/0120059 A1 | 4/2016 | Shedd et al. | |

* cited by examiner

*Primary Examiner* — David D Hwu
(74) *Attorney, Agent, or Firm* — Charlotte Wilson; Hoffman Warnick LLC

(57) ABSTRACT

Modular cooling water assemblies for combined cycle power plant systems are disclosed. Each of the assemblies may include a pump and a heat exchanger, both positioned on a support structure. Additionally, each of the assemblies may include a closed cooling water system supported by the support structure. The closed cooling water system may include a return header fluidly coupled to a return conduit for receiving cooling water previously utilized by the combined cycle power plant system. The closed cooling water system may also include a supply header positioned adjacent the return header, and fluidly coupled to a supply conduit for supplying the cooling water to the combined cycle power plant system. Additionally, the closed cooling water system may include a closed cooling water circuit fluidly coupling the return header to the supply header. The closed cooling water circuit may be fluidly coupled to the heat exchanger and the pump.

18 Claims, 17 Drawing Sheets

MODULAR COOLING WATER ASSEMBLIES FOR COMBINED CYCLE POWER PLANT SYSTEMS

BACKGROUND OF THE INVENTION

The disclosure relates generally to combined cycle power plant systems, and more particularly, to modular cooling water assemblies for combined cycle power plant systems.

Power systems typically include a variety of different turbomachines and/or systems that are used to generate operational load and/or power output. Two conventional power systems used to generate operational loads include gas turbine systems and combined cycle power plants, which typically include a gas turbine system(s) and a steam turbine system(s). Conventional combined cycle power plants employ one or multiple gas turbine system(s) operatively coupled to one or multiple steam turbine system(s). The gas turbine system includes a compressor and a combustor coupled to a gas turbine. The gas turbine is usually coupled to and drives an external component, such as a generator, for producing a load or power output. The steam turbine system may include a high pressure (HP) turbine portion operatively coupled to an intermediate pressure (IP) turbine portion that, in turn, is coupled to a low pressure (LP) turbine. Similar to the gas turbine of the gas turbine system, the HP, IP and LP turbines are employed to drive an external component (e.g., generator). In a typical combined cycle power plant, exhaust gas from the gas turbine is passed to a heat recovery steam generator (HRSG), which may be used to reheat and provide steam to the various turbines of the steam turbine system for enhanced efficiency of the system and/or power plant. Downstream of the HRSG, the exhaust gas is released to the atmosphere through a stack.

To improve operational efficiencies and/or output, power systems utilizing cooling water systems provide cooling water to various portions or components of the system. For example, a cooling water system may provide cooling water to a condenser of the power plant to convert the steam previous used by the steam turbine system back to water. The water formed in the condenser using the cooling water is then fed back to the HRSG and re-converted to steam and provided to the steam turbine system again.

Typically, power plants include cooling water systems that provides cooling water to the power plant. The cooling water systems may include once-through systems or closed-loop systems. In a once-through system water is taken from a nearby source (e.g., rivers, lakes, aquifers, or the ocean), circulated through pipes to absorb heat from the components (e.g., condenser) of the power plant, and then discharged back to the local source. In a closed-loop system, cooling water is continuously reused. Specifically, after the cooling water is circulated through pipes to absorb heat from the components (e.g., condenser) of the power plant, it is provided to a heat exchanger component (e.g., cooling tower) to be re-cooled, and then is recirculated through the power plant.

Conventional cooling water systems for power plants are often custom built for the power plant to ensure the cooling water systems can generate and provide enough cooling water to the plant. When components of the power plant are changed or improved upon, and thus the load of the power plant increases, the demand for cooling water may also increase. Typically conventional cooling water systems must be re-tooled or rebuilt to compensate for the increased cooling water demand. In other instances, the cooling water system must be replaced entirely. The re-tooling of the cooling water system, is expensive, time consuming, and requires the entire power plant be shutdown during the re-tooling process.

Additionally when performing maintenance on conventional cooling water systems, the cooling water systems for power plants must be completely shut down for a period of time. As a result of shutting down the cooling water system, the entire power plant also has to be temporarily shutdown. Shutting down the power plant results in a temporary stoppage in power generation, which ultimately results in a loss of capital or revenue.

Furthermore, conventional cooling water systems often require a large footprint within the power plant. That is, conventional cooling systems are large, and include a plurality of large components or conduits for providing cooling water to and/or from the power plant. As such, designing power plants that include conventional cooling water systems require large spaces, and do not allow for other systems or components of the power plant to be included within the space of the cooling system.

BRIEF DESCRIPTION OF THE INVENTION

A first aspect of the disclosure provides a cooling water assembly for a combined cycle power plant. The cooling water assembly includes: a support structure; a pump positioned on the support structure; a heat exchanger positioned on the support structure; and a closed cooling water system supported by the support structure, the closed cooling water system including: a return header positioned above the support structure, the return header fluidly coupled to a return conduit of the combined cycle power plant system for receiving cooling water previously utilized by the combined cycle power plant system; a supply header positioned adjacent the return header, the supply header fluidly coupled to a supply conduit of the combined cycle power plant system for supplying the cooling water to the combined cycle power plant system; and a closed cooling water circuit fluidly coupling the return header to the supply header, the closed cooling water circuit fluidly coupled to the heat exchanger and the pump.

A second aspect of the disclosure provides a cooling water system for a combined cycle power plant. The cooling water system includes: a first modular cooling water assembly including: a first support structure; a first pump positioned on the first support structure; a first heat exchanger positioned on the first support structure; and a first closed cooling water system supported by the first support structure, the first closed cooling water system including: a first return header positioned above the first support structure, the first return header fluidly coupled to a return conduit of the combined cycle power plant system for receiving cooling water previously utilized by the combined cycle power plant system; a first supply header positioned adjacent the first return header, the first supply header fluidly coupled to a supply conduit of the combined cycle power plant system for supplying the cooling water to the combined cycle power plant system; and a first closed cooling water circuit fluidly coupling the first return header to the first supply header, the first closed cooling water circuit fluidly coupled to the first heat exchanger and the first pump; and a second modular cooling water assembly positioned adjacent and fluidly coupled to the first modular cool water assembly, the second modular cooling water assembly including: a second support structure positioned adjacent the first support structure of the first modular cooling water assembly; a second pump positioned on the second support structure; a second heat exchanger positioned on the second support structure; and a second closed cooling water system supported by the second support structure and in fluid communication with the first closed cooling water system of the first modular cooling water assembly, the second closed cooling water system including: a second return header fluidly coupled to the first return header of the first closed cooling water system, the second return header receiving cooling water from the first return header of the first closed cooling water system; a second supply header positioned adjacent the second return header, the second supply header fluidly coupled to the first supply header of the first closed cooling water system for supplying cooling water to the first supply header; and a second closed cooling water circuit fluidly coupling the second return header to the second supply header, the second closed cooling water circuit fluidly coupled to the second heat exchanger and the second pump.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within the combined cycle power plant systems. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

As indicated above, the disclosure relates generally to combined cycle power plant systems, and more particularly, to modular cooling water assemblies for combined cycle power plant systems.

These and other embodiments are discussed below with reference to FIGS. 1-17. However, those skilled in the art will readily appreciate that the detailed description given herein with respect to these Figures is for explanatory purposes only and should not be construed as limiting.

Figure 1:
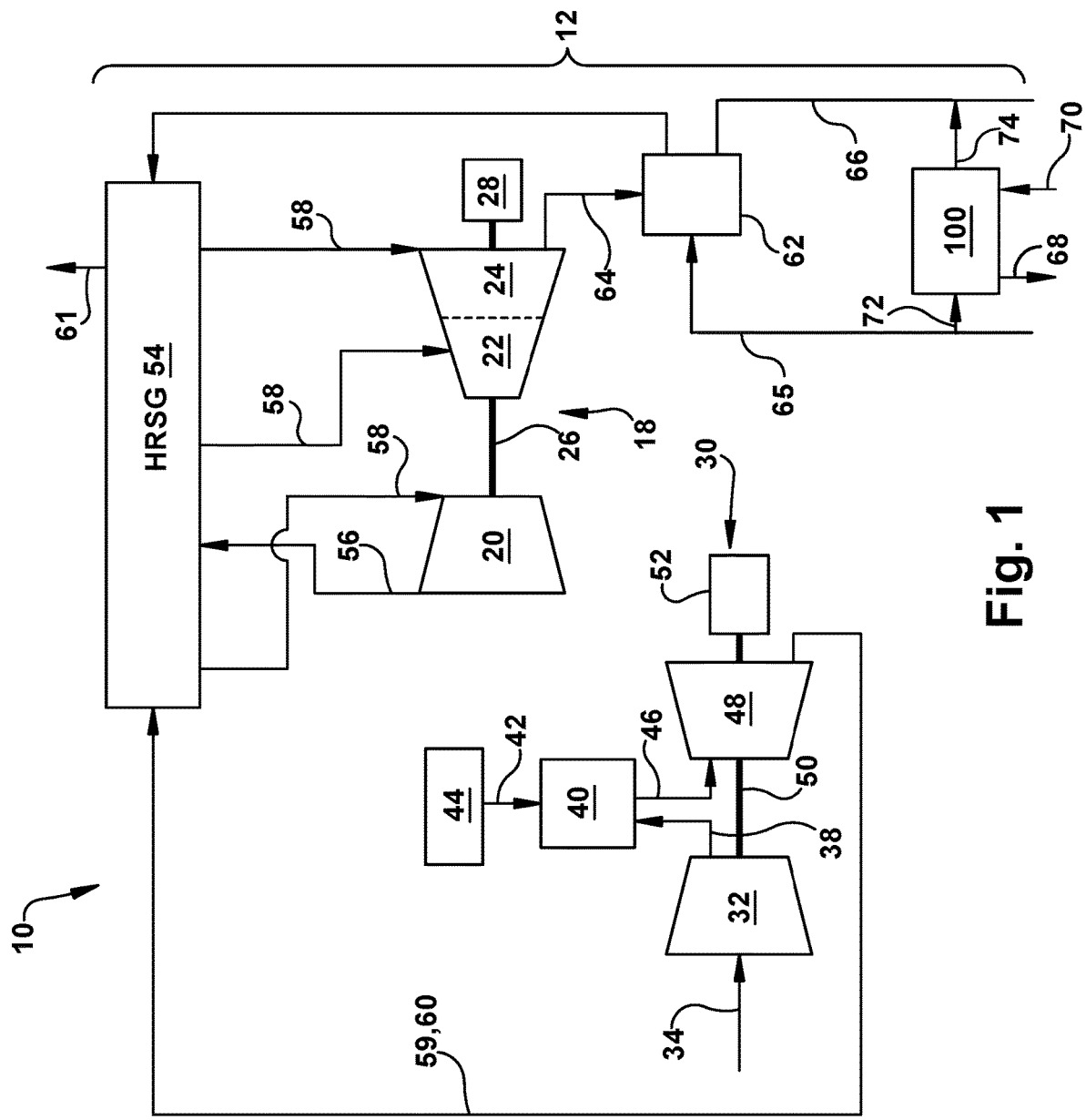
FIG. 1 shows a schematic view of a combined cycle power plant system including a gas turbine system and a steam turbine system, according to embodiments of the disclosure.
Figure 2:
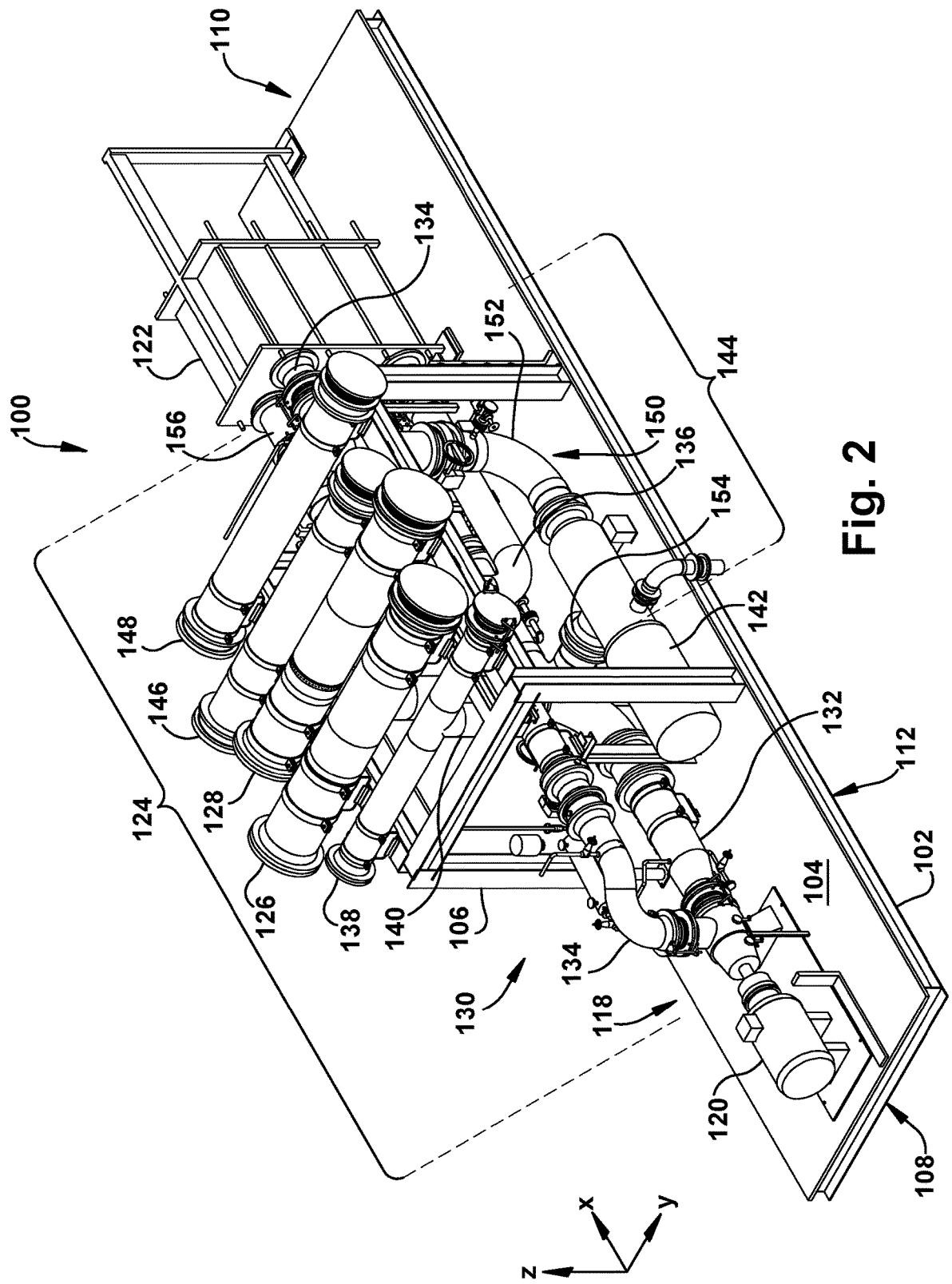
FIG. 2 shows a first isometric view of a modular cooling water assembly utilized by the combined cycle power plant system of FIG. 1, according to embodiments of the disclosure.
Figure 3:
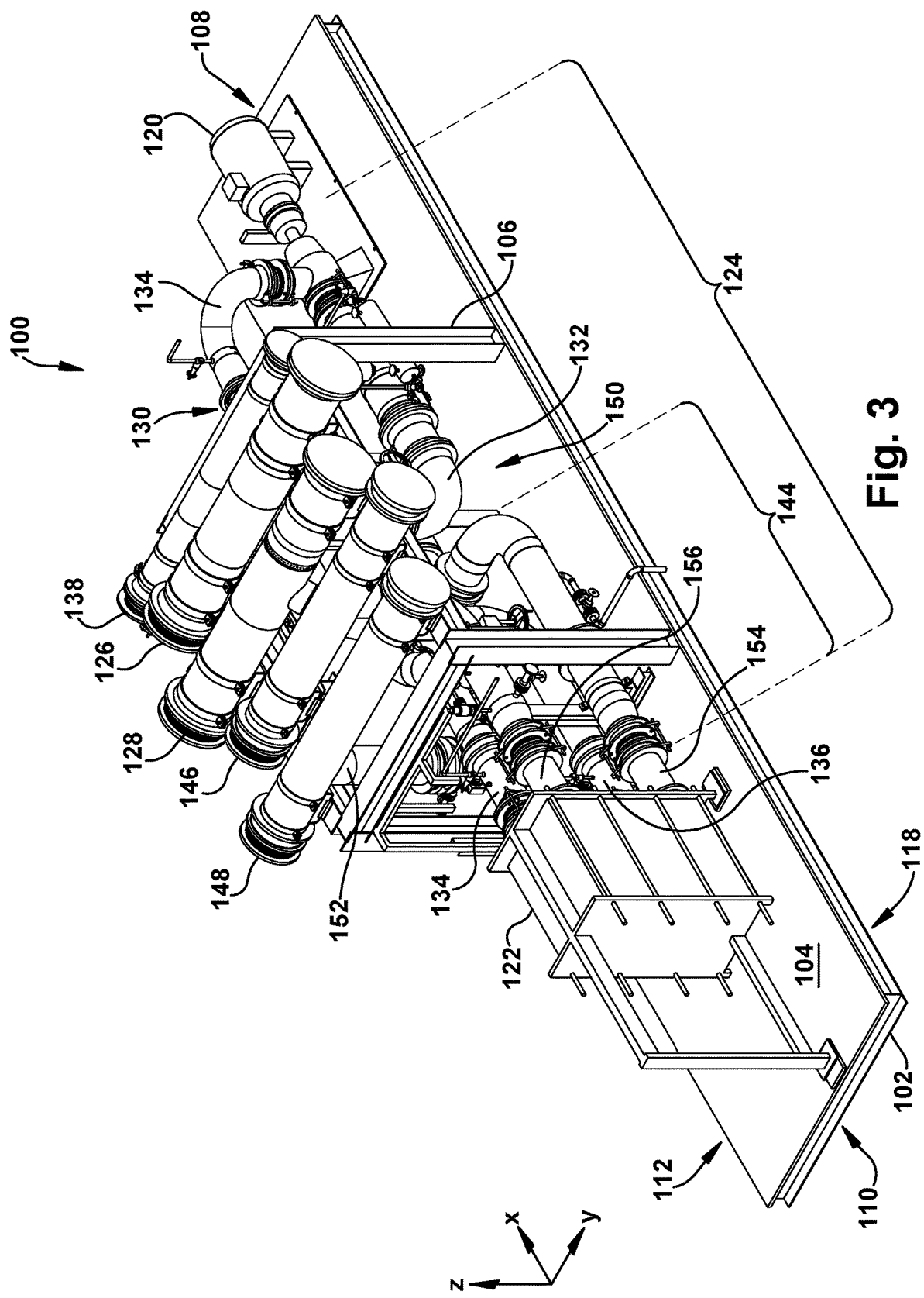
FIG. 3 shows a second isometric view of the modular cooling water assembly of FIG. 2, according to embodiments of the disclosure.
Figure 4:
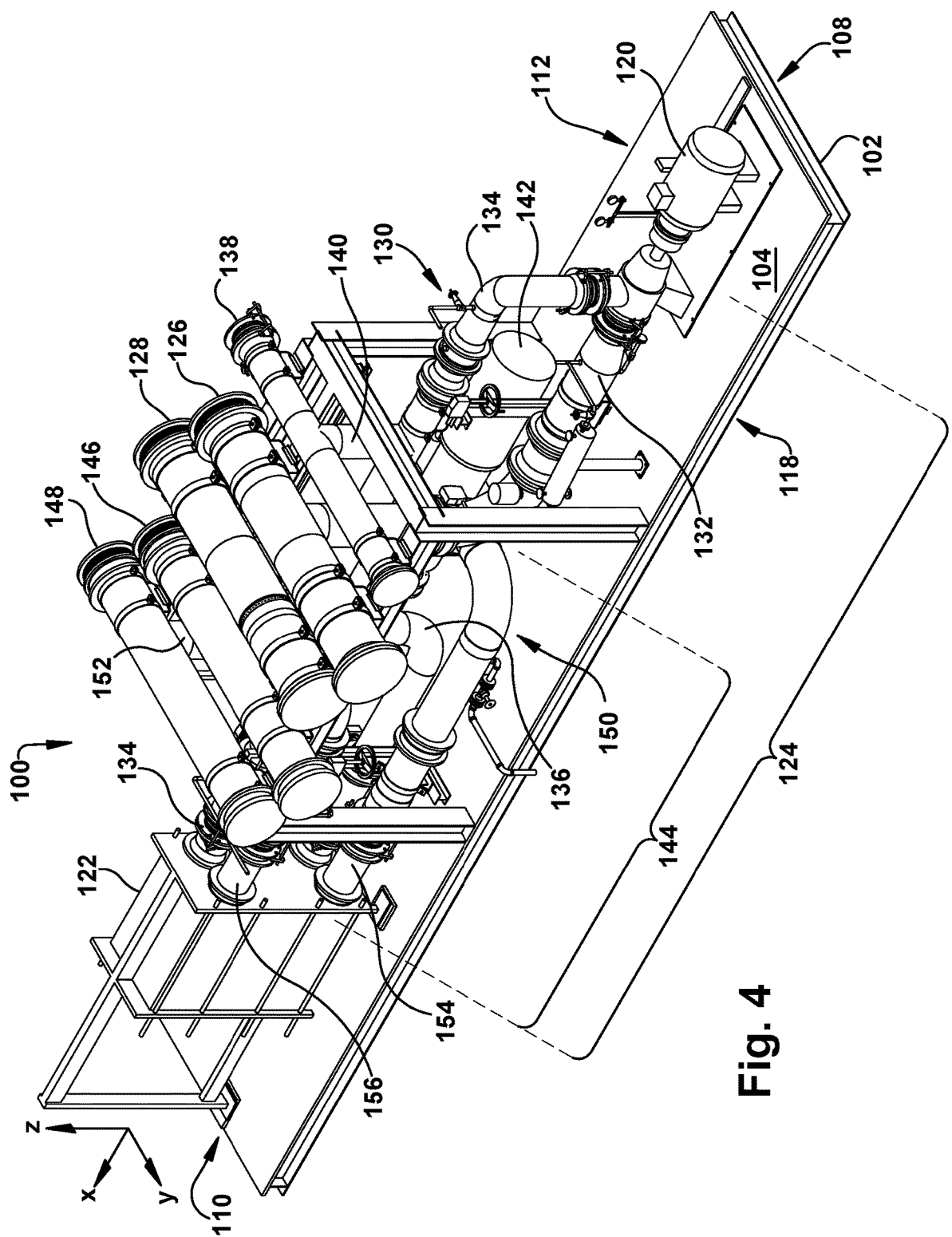
FIG. 4 shows a third isometric view of the modular cooling water assembly of FIG. 2, according to embodiments of the disclosure.
Figure 5:
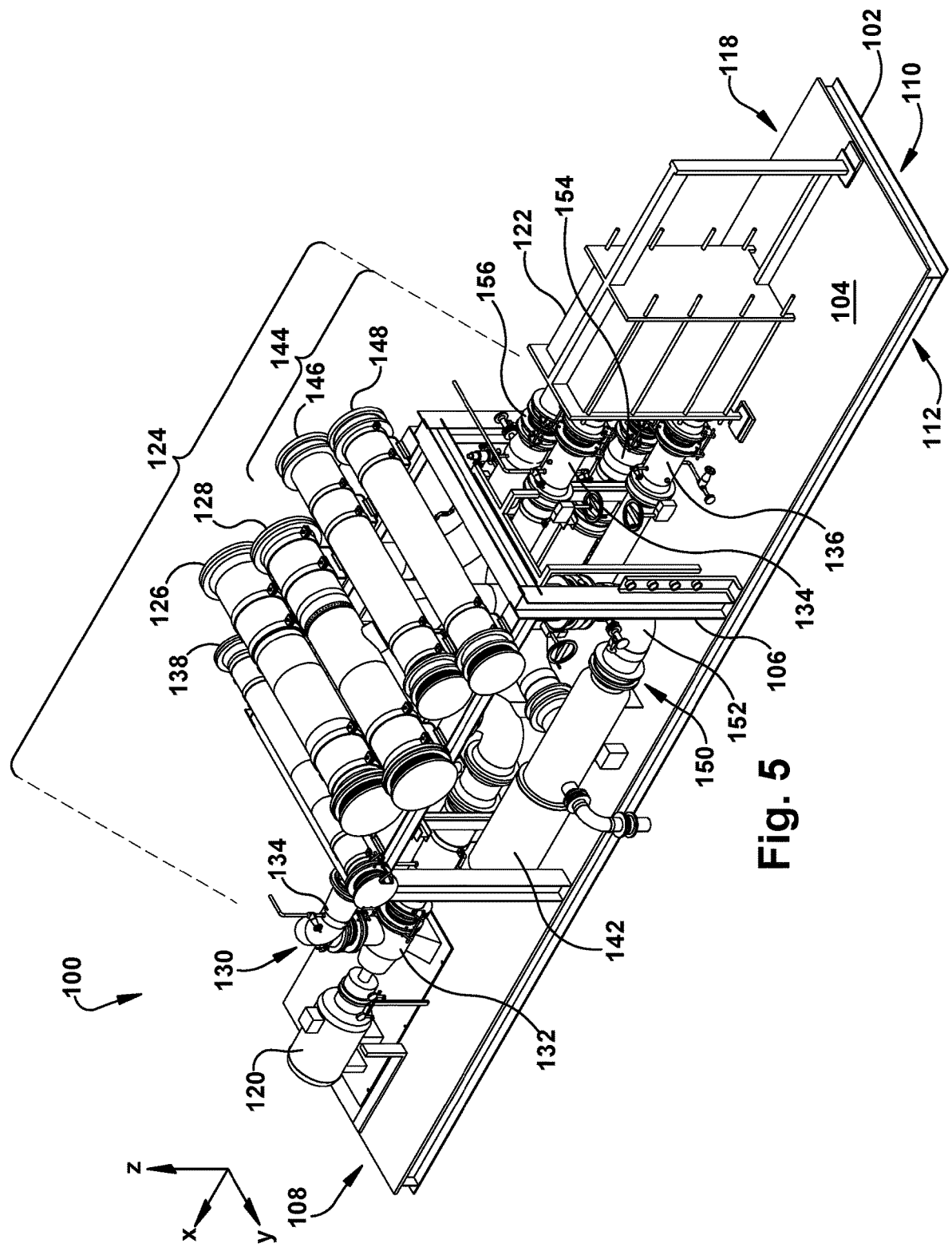
FIG. 5 shows a fourth isometric view of the modular cooling water assembly of FIG. 2, according to embodiments of the disclosure.

FIG. 1 shows a schematic depiction of a system 10 according to various embodiments of the disclosure. As shown, system 10 can include a combined cycle power plant system 12 (hereafter, "power plant system 12") including a steam turbine (ST) system 18, which in the depiction shown, can include a high pressure (HP) portion 20, an intermediate pressure (IP) portion 22 and a low pressure (LP) portion 24, as is known in the art. HP portion 20, IP portion 22 and LP portion 24 of ST system 18 may all be coupled and/or positioned on and/or may be configured to rotate a shaft 26 to produce mechanical work and/or to drive an additional component of ST system 18. As shown in FIG. 1, shaft 26 of ST system 18 may be coupled to and/or may drive an external component, such as a generator 28 configured to generate power and/or produce a load.

Power plant system 12 can further include a gas turbine (GT) system 30. GT system 30 may include a compressor 32. Compressor 32 compresses an incoming flow of fluid 34 (e.g., air) as it flows through compressor 32. GT system 30 may also include a plurality of stages of stator vanes (not shown) and rotating blades (not shown) positioned within compressor 32. The stator vanes and rotating blades positioned within compressor 32 may be configured to aid in moving and/or passing fluid 34 through compressor 32. Compressor 32 delivers a flow of compressed fluid 38 (e.g., compressed air) to a combustor 40. Combustor 40 mixes the flow of compressed fluid 38 with a pressurized flow of fuel 42 provided by a fuel supply 44 and ignites the mixture to create a flow of combustion gas 46. The flow of combustion gas 46 is in turn delivered to a turbine component 48, which typically includes a plurality of stages of stator vanes (not shown) and turbine blades (not shown), similar to compressor 32. The flow of combustion gas 46 drives turbine component 48 to produce mechanical work. The mechanical work produced in turbine component 48 drives compressor 32 via a shaft 50, and may be used to drive an external component such as a generator 52 to generate power and/or produce a load.

Although power plant system 12 is shown in FIG. 1 to include a dual-shaft configuration where two separate generators 28, 52 are utilized, it is understood that in other non-limiting examples, ST system 18 and GT system 30 may share a single shaft and in turn, may share a single generator. Additionally, although power plant system 12 is shown to only include a single ST system 18 and single GT system 30, it is understood that power plant system 12 may include a plurality of ST systems 18 and/or GT system(s) 30 that may be configured to generate an operational load and/or power output.

Power plant system 12 can further include a heat recovery steam generator (HRSG) 54 fluidly connected with ST system 18 (e.g., with HP portion 20, IP portion 22 and/or LP portion 24) and GT system 30. As shown in the non-limiting example of FIG. 1, HRSG 54 may be fluidly connected and/or coupled with ST system 18 via exhaust conduit(s) 56 to receive exhaust fluid (e.g., steam) from ST system 18, as well as, provide steam to the portions of ST system 18 via conduits 58. Additionally in the non-limiting example of FIG. 1, HRSG 54 may be fluidly connected and/or coupled with GT system 30 via an exhaust channel 59 coupled to and/or in fluid communication with turbine component 48. Exhaust channel 59 may provide exhaust fluid 60 (e.g., exhaust gas) from GT system 30 to HRSG 54 to be utilized in generating and/or heating steam for ST system 18. A stack 61 of HRSG 54 may exhaust or release (excess or used) gas (e.g., exhaust fluid 60) and/or fluid from HRSG 54 into the atmosphere and/or out of power plant system 12, e.g., via environment controls (not shown).

Power plant system 12 can further include a condenser 62. Condenser 62 may be in fluid communication and/or may be fluidly coupled with various components of power plant system 12. In a non-limiting example, condenser 62 may be fluidly connected and/or coupled to LP portion 24 of ST system 18 via steam exhaust duct 64. Condenser 62 may be configured to condense exhaust flow and/or bypass flow (not shown) from ST system 18 and/or HRSG 54, and providing condensed fluid (e.g., condensate water) to HRSG 54, as is known in the art. Condenser 62 may be provided and/or utilize cooling water from a cooling water source (e.g., reservoir, storage tank, natural body of water, and the like) during operation. Condenser 62 may receive the cooling water via a main cooling water supply conduit 65 in fluid communication with condenser 62 and the cooling water source (not shown), respectively. Once utilized by condenser 62, the cooling water may be recirculated back to the cooling water source and/or a cooling system (e.g., cooling tower, outfall structure or natural draft cooling tower) via a main cooling water return conduit 66 to re-cool the cooling water. As shown in FIG. 1, and as discussed herein with respect to FIGS. 2-17, a portion of the cooling water supplied to condenser 62 via main cooling water supply conduit 65 may also be provided to and utilized by at least one modular cooling water assembly 100.

Figure 6:
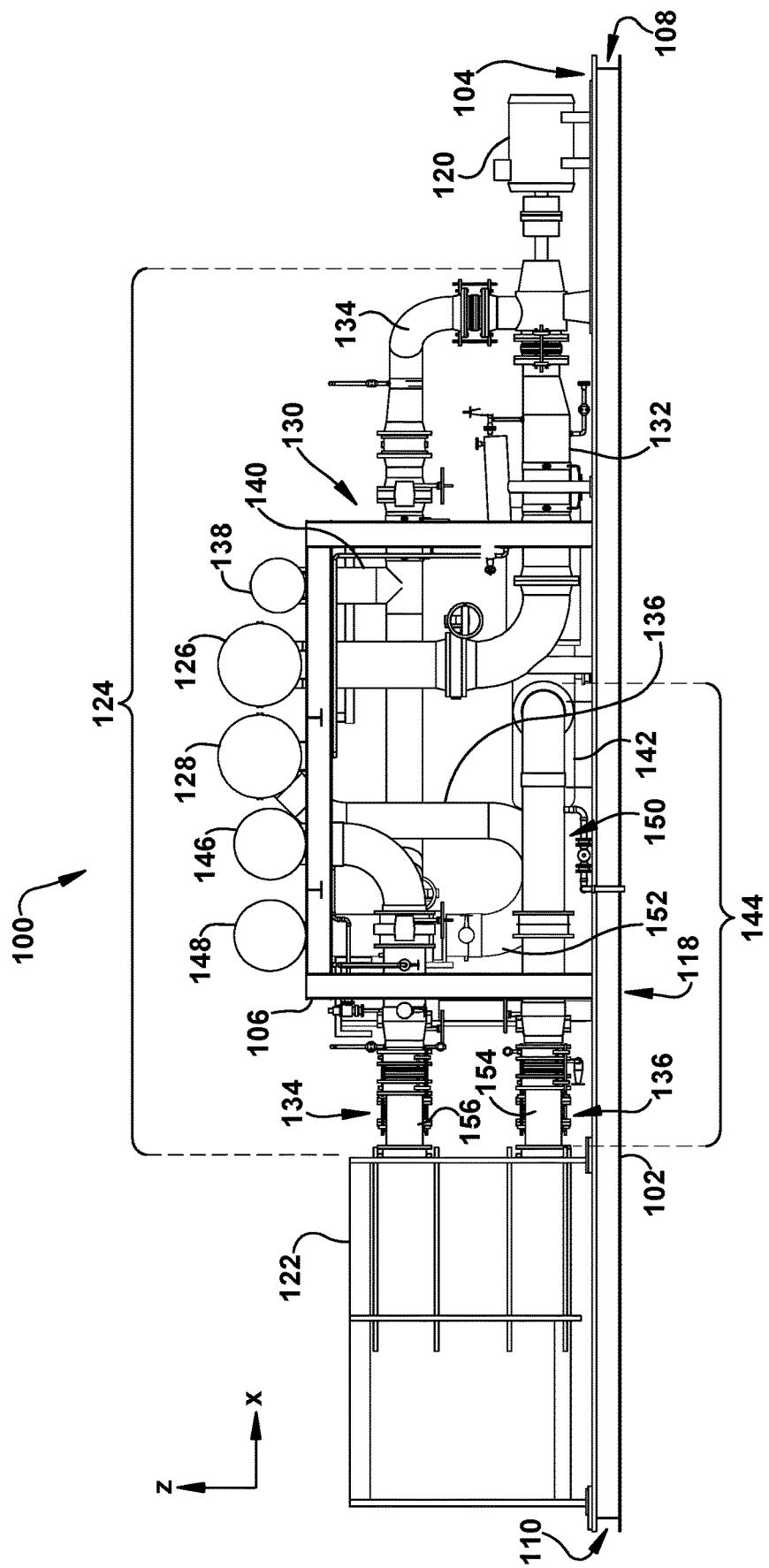
FIG. 6 shows a first side view of the modular cooling water assembly of FIG. 2, according to embodiments of the disclosure.
Figure 7:
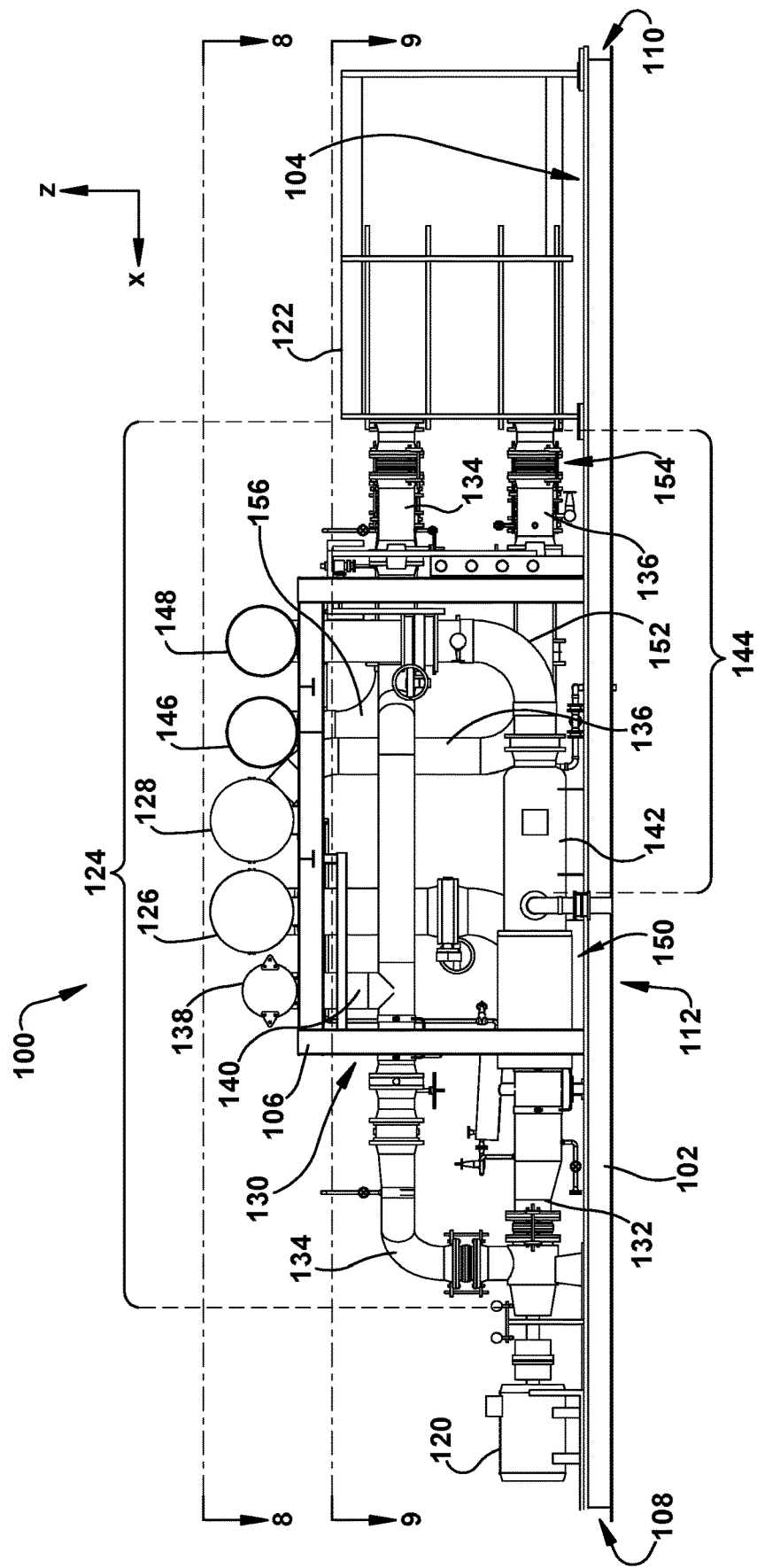
FIG. 7 shows a second side view of the modular cooling water assembly of FIG. 2, according to embodiments of the disclosure.
Figure 8:
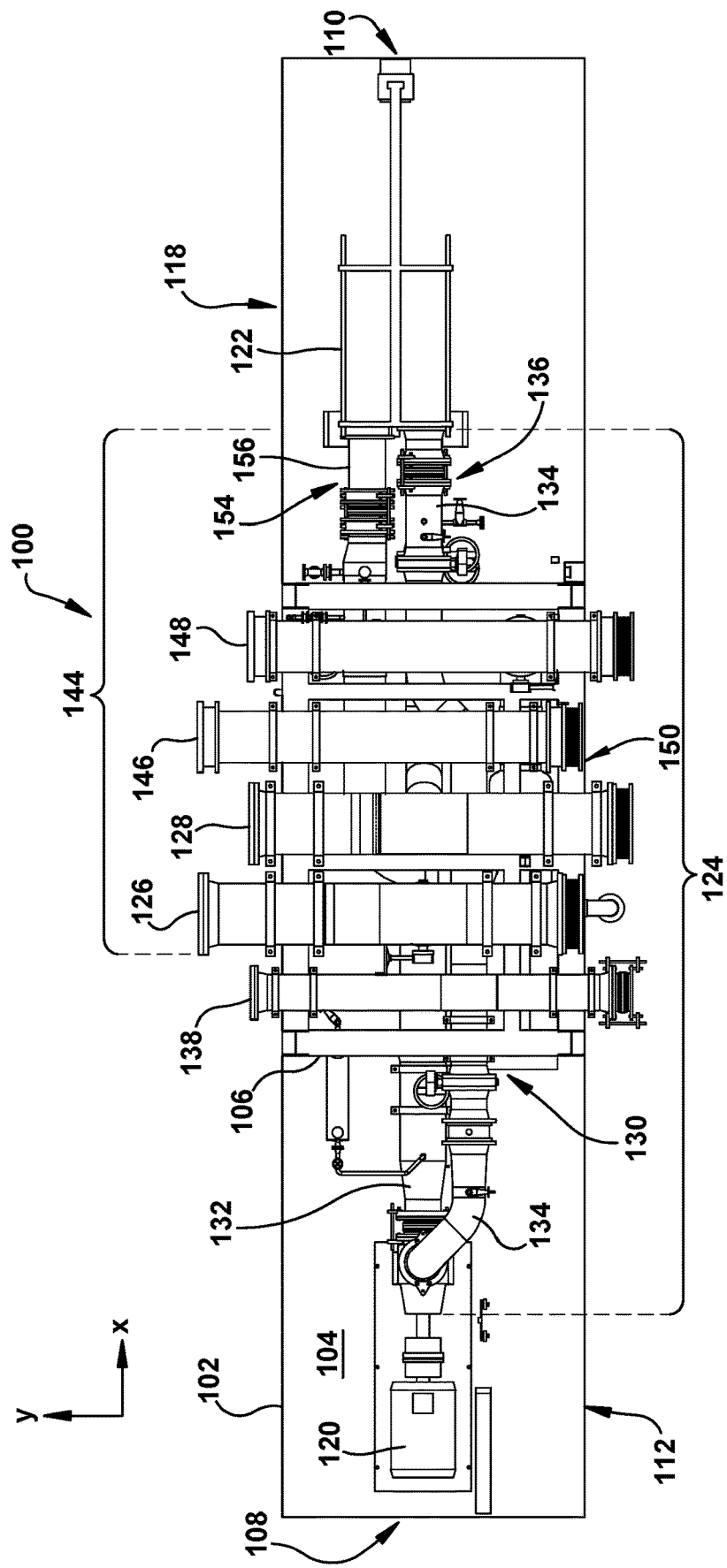
FIG. 8 shows a top view of the modular cooling water assembly of FIG. 2, according to embodiments of the disclosure.
Figure 9:
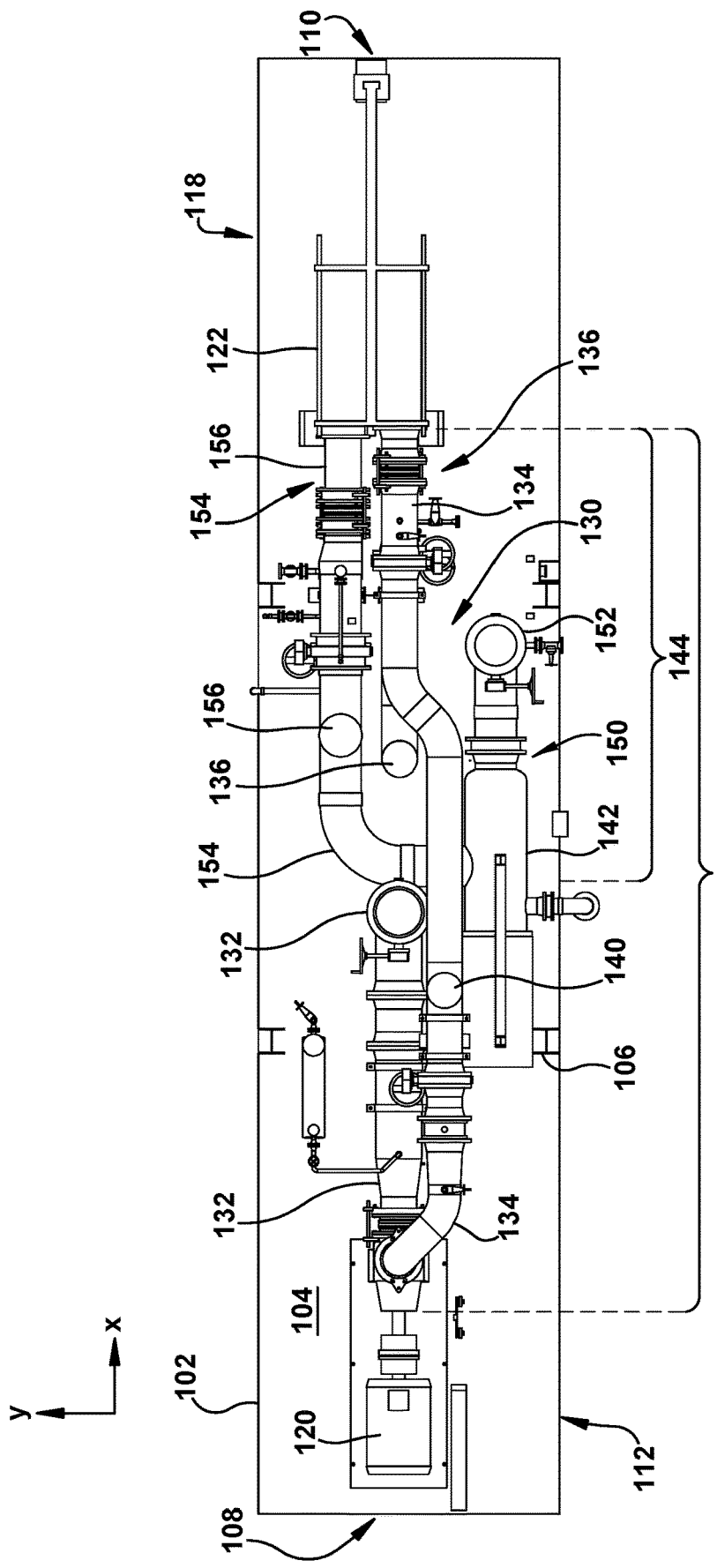
FIG. 9 shows a top, cross-sectional view of the modular cooling water assembly taken along line 9 in FIG. 7, according to embodiments of the disclosure.

FIGS. 2-9 show various views of a modular cooling water assembly 100 for combined cycle power plant system 12 of FIG. 1. Specifically, FIGS. 2-5 show various isometric views of modular cooling water assembly 100, FIG. 6 shows a first side view of modular cooling water assembly 100, and FIG. 7 shows a second side view of modular cooling water assembly 100. Furthermore, FIG. 8 shows a top view of modular cooling water assembly 100, and FIG. 9 shows a top, cross-sectional view of modular cooling water assembly 100 taken along line 9 in FIG. 7. The non-limiting example of modular cooling water assembly 100, and its various components, may be addressed herein with reference to all of FIGS. 2-9 to ensure that each of the plurality of components are adequately and accurately described and shown. When applicable, specific figures of the collective FIGS. 2-9 may be referenced when discussing a component(s) of modular cooling water assembly 100. Additionally, several reference lines or directions may be used regularly herein, and it should prove helpful to define these reference lines or directions at the onset of this section. For example, in each of FIGS. 2-9 "X," "Y," and "Z" reference lines or directions are displayed and may be used herein to describe the position of various components and/or features of modular cooling water assembly 100.

Turning to FIGS. 2-9, modular cooling water assembly 100 utilized by combined cycle power plant system 12 (see, FIG. 1) is show. Modular cooling water assembly 100 may provide cooling water to combined cycle power plant system 12 and its various components included therein. For example, and as discussed herein, modular cooling water assembly 100 may provide cooling water to lube oil systems (not shown) providing lube oil to ST system 18/GT system 30, water-pumps (not shown) providing water to ST system 18, generators 28, 52, and any other portion of combined cycle power plant system 12 that may require cooling water during operation. Modular cooling water assembly 100 may include a predetermined output capacity that may be specific to the various components included therein and/or the operational load for combined cycle power plant system 12. Additionally, and as discussed herein, modular cooling water assembly 100 may be combined with and/or may be in fluid communication with at least one additional, and perhaps distinct, modular cooling water assembly (see, FIG. 13-17) to improve operation (e.g., increase output capacity by combining modular cooling water assemblies) and/or provide additional cooling water to combined cycle power plant system 12.

Modular cooling water assembly 100 may include a rigid support structure 102. Support structure 102 may contain, house, support, and/or at least partially-surround the various features and/or components of modular cooling water assembly 100. In the non-limiting example shown in FIGS. 2-9, support structure 102 may include a base or base portion 104 (hereafter, "base 104"). Base 104 may act as a bottom or floor for support structure 102 of modular cooling water assembly 100. As shown in FIGS. 2-9, and discussed in detail herein, base 104 of support structure 102 may house, include, and/or provide a surface or structure that may receive and/or support various components of modular cooling water assembly 100. Additionally, and as discussed herein, at least at least a portion of the components of modular cooling water assembly 100 may be coupled or affixed to base 104 of support structure 102. Although shown as a solid component or surface, base 104 of support structure 102 may also be configured as frame or cage that may be designed to provide a surface or structure that may receive and/or support various components of modular cooling water assembly 100, as discussed herein. Base 104 may be formed from any component, structure and/or material that may support the various components of modular cooling water assembly 100, and allow modular cooling water assembly 100 to be easily transported, as discussed herein. For example, base 104 may be formed from a solid sheet of metal, as a frame made of steel I-beams, or any other similar structure and material having similar properties.

Support structure 102 of modular cooling water assembly 100 may also include a plurality of support frame 106 extending from base 104. Specifically, and as shown in FIGS. 2-9, support structure 102 may include a plurality of support frame 106 positioned above and/or extending from base 104 in a "Z" direction. Support frame 106 may be coupled to, permanently affixed to, or formed integral with base 104. In the non-limiting example shown in FIGS. 2-9, support frame 106 may be centrally positioned on base 104, and/or may be positioned between, but spatially separated from, a first end 108 of base 104, and a second end 110 of base 104. As such, and as shown in FIGS. 2-9, support frame 106 may not be positioned, formed, and/or may not extend in an "X" direction over the entire length of base 104. Additionally in the non-limiting example, support frame 106 may be positioned, formed, and/or may extend in a "Y" direction over the entire width of base 104, between a first side 112 of base 104 and a second side 118 of base 104. As discussed herein, support frame 106 of support structure 102 may substantially surround, and provide support to at least a portion of the components of modular cooling water assembly 100. As shown in FIGS. 2-9 support frame 106 may be formed from I-beams of, e.g., steel. However, it is understood support frame 106 may be formed as any component or structure that may support the various components of modular cooling water assembly 100, and allow modular cooling water assembly 100 to be easily transported, as discussed herein.

Base 104 and/or support frame 106 of support structure 102 may improve transportability of modular cooling water assembly 100. That is, the size and configuration of base 104 and/or support frame 106 of support structure 102 may allow modular cooling water assembly 100 to be more easily moved, transported to, and/or positioned within combined cycle power plant system 12. As discussed herein, base 104 and support frame 106 may support, house, receive, and/or at least partially surround the various components of cooling water assembly 100. Additionally, the components of modular cooling water assembly 100 may be supported by, coupled, or affixed to base 104 and/or support frame 106. As a result, modular cooling water assembly 100, and all of the features included therein, may be moved, transported, and/or positioned as a single unit. For example, base 104 of support structure 102 may be lifted by a forklift, hydraulic jack, or a crane to position modular cooling water assembly 100 within combined cycle power plant system 12 or put modular cooling water assembly 100 on a transportation vehicle (e.g., flatbed of semi-trailer, flatbed of train car, and the like). Additionally, or alternatively, a crane may be coupled to support frame 106 of support structure 102 to position modular cooling water assembly 100 within combined cycle power plant system 12 or put modular cooling water assembly 100 on a transportation vehicle (e.g., a flatbed semi-trailer, a flatbed train car, and the like).

As shown in FIGS. 2-9, modular cooling water assembly 100 may also include a pump 120 positioned on support structure 102. Specifically, pump 120 may be positioned on and/or coupled to base 104 of support structure 102, and may be positioned adjacent first end 108 of base 104. Pump 120 may be formed as any suitable fluid pump that may aid in moving cooling water through a closed cooling water system of modular cooling water assembly 100, as discussed herein.

Modular cooling water assembly 100 also include a heat exchanger 122. Heat exchanger 122 may be positioned on support structure 102, opposite pump 120. As shown in FIGS. 2-9, heat exchanger 122 may be positioned on and/or coupled to base 104 of support structure 102, and may be positioned adjacent second end 110. In the non-limiting example, heat exchanger 122 may be formed as a plate-type heat exchanger. However, it is understood that heat exchanger 122 may be formed as any suitable heat exchanger that may aid in transferring heat between fluids passing through modular cooling water assembly 100, and more specifically cooling water flowing through a closed cooling water system of modular cooling water assembly 100, as discussed herein.

In the non-limiting examples shown in FIGS. 2-9, modular cooling water assembly 100 may also include a closed cooling water system 124. Closed cooling water system 124 may be at least partially supported by support structure 102. Specifically, closed cooling water system 124, and its various components discussed herein, may be supported by base 104 and/or support frame 106 of support structure 102. Additionally, and as discussed herein, closed cooling water system 124 (and its components) may be substantially positioned within the boundaries of support structure 102, and may not extend in the "X" direction beyond first end 108 and second end 110 of base 104. As discussed herein, closed cooling water system 124 may recirculate and re-cool cooling water previously provided to various portions of combined cycle power plant system 12 (e.g., lube oil systems, water-pumps, generators 28, 52) through modular cooling water assembly 100, and its various components, before providing the re-cooled water back to the various portions of combined cycle power plant system 12.

Closed cooling water system 124 of modular cooling water assembly 100 may include a return header 126, and a supply header 128 positioned adjacent return header 126. As shown in the non-limiting example in FIGS. 2-8, return header 126 and supply header 128 of closed cooling water system 124 may be positioned above support frame 106 of support structure 102. Additionally, return header 126 and supply header 128 may be positioned on, contact, coupled to, and/or supported by support frame 106 of support structure 102 for modular cooling water assembly 100. Return header 126 and supply header 128 may also be positioned, formed, and/or extend in the "Y" direction across the entire width of base 104. As a result of both return header 126 and supply header 128 extending in the "Y" direction, supply header 128 may extend substantially parallel to return header 126 and/or return header 126 and supply header 128 may extend substantially parallel with one another. In the non-limiting example, return header 126 and supply header 128 may also extend in the "Y" direction beyond each of first side 112 and second side 118 of base 104 (see, FIGS. 2-5 and 8). As discussed herein, return header 126 and supply header 128 may extend beyond each of first side 112 and second side 118 of base 104 to aid in fluid coupling return header 126 and supply header 128 of closed cooling water system 124 in modular cooling water assembly 100 with return headers and supply headers included within other modular cooling water assemblies (see, FIGS. 13-17). Also discussed herein, supply header 128 of modular cooling water assembly 100 may be fluidly coupled to a supply conduit 68 (see, FIGS. 1 and 14-17) to provide (re-cooled) cooling water to portions of combined cycle power plant system 12 (e.g., lube oil systems, water-pumps, generators 28, 52). Additionally, return header 126 may be fluidly coupled to a return conduit 70 (see, FIG. 1) to receive the cooling water utilized by various portions of combined cycle power plant system 12, and subsequently provide the cooling water back to closed cooling water system 124 of modular cooling water assembly 100.

Closed cooling water system 124 of modular cooling water assembly 100 may also include a closed cooling water circuit 130. As shown in FIGS. 2-9, closed cooling water circuit 130, and the various components included therein, may be positioned on, supported by, and/or extend over support structure 102. Additionally, at least a portion of the components forming closed cooling water circuit 130 may be positioned within and/or substantially surrounded by support frame 106 of support structure 102. As discussed herein, closed cooling water circuit 130 may fluidly couple return header 126 to supply header 128, and may be fluidly coupled to pump 120 and heat exchanger 122, respectively, to recirculate and re-cool cooling water previously provided to portions of combined cycle power plant system 12 before providing the re-cooled water back to the portions of combined cycle power plant system 12 via supply header 128 and/or supply conduit 68 (see, FIG. 1).

As shown in the non-limiting example of FIGS. 2-9, closed cooling water circuit 130 of closed cooling water system 124 for modular cooling water assembly 100 may include a supply pipe 132. Supply pipe 132 may extend between return header 126 and pump 120. More specifically, supply pipe 132 of closed cooling water circuit 130 may extend between and may fluidly couple return header 126 and pump 120. In the non-limiting example, supply pipe 132 may extend downward from (e.g., in the "Z" direction) return header 126, toward base 104 of support structure 102, and may also extend in the "X" direction toward pump 120. Supply pipe 132 of closed cooling water circuit 130 may be coupled to and/or in fluid communication with a suction portion or opening of pump 120. As such, and as discussed herein, pump 120 may pull cooling water previously provided to the portions of combined cycle power plant system 12 from return header 126 through supply pipe 132, and may provide the previously provided cooling water to other portions of closed cooling water circuit 130 so the water may be re-cooled and provided to portions of combined cycle power plant system 12 again.

Closed cooling water circuit 130 of closed cooling water system 124 may also include a heat exchanger inlet pipe 134. As shown in FIGS. 2-9 heat exchanger inlet pipe 134 may extend between pump 120 and heat exchanger 122. Specifically, heat exchanger inlet pipe 134 may extend substantially in the "X" direction from pump 120 to heat exchanger 122, and may also fluidly couple pump 120 and heat exchanger 122. In the non-limiting example, heat exchanger inlet pipe 134 may be coupled to and/or in fluid communication with the discharge portion or opening of pump 120. Heat exchanger inlet pipe 134 may also be coupled to and/or in fluid communication with heat exchanger 122. As discussed herein, pump 120 may discharge cooling water previously provided to portions of combined cycle power plant system 12 through heat exchanger inlet pipe 134, which in turn may provide the cooling water to heat exchanger 122 to be (re)cooled.

Additionally, closed cooling water circuit 130 of closed cooling water system 124 may include a heat exchanger outlet pipe 136. In the non-limiting example shown in FIGS. 2-9, heat exchanger outlet pipe 136 may extend between heat exchanger 122 and supply header 128. As shown in FIGS. 2-9, heat exchanger outlet pipe 136 may extend substantially in the "X" direction from heat exchanger 122, and may also extend upward (e.g., "Z" direction) from base 104 of support structure 102 to supply header 128. As such, supply header 128 of closed cooling water system 124 may extend substantially perpendicular to heat exchanger outlet pipe 136 of closed cooling water circuit 130. Heat exchanger outlet pipe 136 may also fluidly couple heat exchanger 122 and supply header 128. Specifically, heat exchanger outlet pipe 136 may be coupled to and/or in fluid communication with heat exchanger 122, as well as supply header 128 of closed cooling water system 124. As discussed herein, heat exchanger 122 may (re)cool cooling water, and may subsequently provide the cooling water to supply header 128 via heat exchanger outlet pipe 136.

Closed cooling water system 124 of modular cooling water assembly 100 may also include a bypass header 138 in fluid communication with closed cooling water circuit 130. Specifically, and as shown in FIGS. 2-9, bypass header 138 may be in fluid communication with heat exchanger inlet pipe 134 of closed cooling water circuit 130 via a bypass conduit 140 (FIGS. 2, 4, 6, 7, and 9). Bypass conduit 140 may be positioned between and may fluidly couple heat exchanger inlet pipe 134 of closed cooling water circuit 130 and bypass header 138. In the non-limiting example bypass header 138 may be positioned adjacent return header 126 of closed cooling water system 124. Additionally, bypass header 138 may be positioned above support frame 106 of support structure 102, and may be positioned on, contact, coupled to, and/or supported by support frame 106 of support structure 102 for modular cooling water assembly 100. Similar to return header 126 and supply header 128, bypass header 138 may also be positioned, formed, and/or extend in the "Y" direction across the entire width of base 104. As a result, bypass header 138 may extend substantially parallel to supply header 128 and/or return header 126. Also similar to return header 126 and/or supply header 128, bypass header 138 may extend in the "Y" direction beyond each of first side 112 and second side 118 of base 104 (see, FIGS. 2-5 and 8) to aid in fluid coupling bypass header 138 of modular cooling water assembly 100 with bypass headers included within other modular cooling water assemblies (see, FIGS. 13-17). As discussed herein, bypass header 138 of modular cooling water assembly 100 may be fluidly coupled to bypass headers of other modular cooling water assemblies to allow cooling water flowing through the heat exchanger inlet pipe 134 of modular cooling water assembly 100 to flow to other modular cooling water assemblies, and subsequently be cooled by heat exchangers of other modular cooling water assemblies.

Modular cooling water assembly 100 may also include a filter 142. Filter 142 may be positioned on support structure 102. Specifically, filter 142 may be positioned on, supported by, and/or coupled to base 104 of support structure 102, and may be between first end 108 and second end 110 of base 104. Additionally as shown in FIGS. 2-9, support frame 106 may at least partially surround filter 142 of modular cooling water assembly 100. Filter 142 may be formed as any suitable fluid-filtering device or component that may remove and/or filter out contaminants (e.g., debris, sand, and the like) found within the cooling water provided to modular cooling water assembly 100 from the cooling water source (e.g., reservoir, storage tank, natural body of water, and the like) providing cooling water to condenser 62 via main cooling water supply conduit 65 (see, FIG. 1), as discussed herein. That is, and as discussed herein, modular cooling water assembly 100 may be in fluid communication with main cooling water supply conduit 65, and may receive a portion of the cooling water flowing through main cooling water supply conduit 65 during operation of combined cycle power plant system 12.

In the non-limiting examples shown in FIGS. 2-9, modular cooling water assembly 100 may also include an auxiliary cooling water system 144 that provides auxiliary cooling water to heat exchanger 122 to aid in the (re)cooling of cooling water flowing through closed cooling water system 124 of modular cooling water assembly 100. Auxiliary cooling water system 144 may be at least partially supported by support structure 102. Specifically, auxiliary cooling water system 144, and its various components discussed herein, may be supported by base 104 and/or support frame 106 of support structure 102. Additionally, and as discussed herein, auxiliary cooling water system 144 (and its components) may be substantially positioned within the boundaries of support structure 102, and may not extend in the "X" direction beyond first end 108 and second end 110 of base 104. As discussed herein, "auxiliary cooling water" may refer to the portion of cooling water provided to auxiliary cooling water system 144 of modular cooling water assembly 100 via main cooling water supply conduit 65.

Auxiliary cooling water system 144 of modular cooling water assembly 100 may include an auxiliary return header 146, and an auxiliary supply header 148 positioned adjacent auxiliary return header 146. Additionally in the non-limiting examples, auxiliary return header 146 may also be positioned adjacent supply header 128 of closed cooling water system 124. As shown in FIGS. 2-8, auxiliary return header 146 and auxiliary supply header 148 of auxiliary cooling water system 144 may be positioned above support frame 106 of support structure 102. Additionally, auxiliary return header 146 and auxiliary supply header 148 may be positioned on, contact, coupled to, and/or supported by support frame 106 of support structure 102 for modular cooling water assembly 100.

Auxiliary return header 146 and auxiliary supply header 148 may also be positioned, formed, and/or extend in the "Y" direction across the entire width of base 104. As a result of both auxiliary return header 146 and auxiliary supply header 148 extending in the "Y" direction, auxiliary supply header 148 may extend substantially parallel to auxiliary return header 146 and/or auxiliary return header 146 and auxiliary supply header 148 may extend substantially parallel with one another. Additionally, auxiliary return header 146 and auxiliary supply header 148 of auxiliary cooling water system 144 may extend substantially parallel to supply header 128 of closed cooling water system 124. In the non-limiting example, auxiliary return header 146 and auxiliary supply header 148 may also extend in the "Y" direction beyond each of first side 112 and second side 118 of base 104 (see, FIGS. 2-5 and 8). As discussed herein, auxiliary return header 146 and auxiliary supply header 148 may extend beyond each of first side 112 and second side 118 of base 104 to aid in fluid coupling auxiliary return header 146 and auxiliary supply header 148 of auxiliary cooling water system 144 in modular cooling water assembly 100 with auxiliary return headers and auxiliary supply headers included within other modular cooling water assemblies (see, FIGS. 13-17). Also discussed herein, auxiliary supply header 148 may be fluidly coupled to an auxiliary supply conduit 72 (see, FIGS. 1 and 13-15) to provide auxiliary cooling water from main cooling water supply conduit 65 to an auxiliary cooling water circuit. Additionally, auxiliary return header 146 may be fluidly coupled to an auxiliary return conduit 74 (see, FIGS. 1 and 13-15) to receive the auxiliary cooling water from the auxiliary cooling water circuit and provide it to main cooling water return conduit 66, and subsequently to the auxiliary cooling water source and/or another cooling system (e.g., cooling tower, outfall structure or natural draft cooling tower), as discussed herein.

As shown in FIGS. 2-9, auxiliary cooling water system 144 of modular cooling water assembly 100 may also include an auxiliary cooling water circuit 150. Auxiliary cooling water circuit 150, and the various components included therein, may be positioned on, supported by, and/or extend over support structure 102. Specifically, auxiliary cooling water circuit 150 may be supported by and extend over base 104 of support structure 102. Additionally, at least a portion of the components forming auxiliary cooling water circuit 150 may be positioned within and/or substantially surrounded by support frame 106 of support structure 102. As discussed herein, auxiliary cooling water circuit 150 may fluidly couple auxiliary return header 146 to auxiliary supply header 148, and may be fluidly coupled to filter 142 and heat exchanger 122, respectively. Additionally, and as discussed herein, auxiliary cooling water circuit 150 may provide auxiliary cooling water to modular cooling water assembly 100 to aid in the (re)cooling of cooling water flowing through closed cooling water system 124 before the cooling water in closed cooling water system 124 is provided to portions of combined cycle power plant system 12.

As shown in the non-limiting example of FIGS. 2-9, auxiliary cooling water circuit 150 of auxiliary cooling water system 144 for modular cooling water assembly 100 may include an auxiliary supply pipe 152. Auxiliary supply pipe 152 may extend between auxiliary supply header 148 and filter 142. More specifically, auxiliary supply pipe 152 of auxiliary cooling water circuit 150 may extend between and may fluidly couple auxiliary supply header 148 and filter 142. In the non-limiting example, auxiliary supply pipe 152 may extend downward from (e.g., in the "Z" direction) auxiliary supply header 148, toward base 104 of support structure 102, and may also extend in the "X" direction toward filter 142. As such, auxiliary supply header 148 of auxiliary cooling water system 144 may extend substantially perpendicular to auxiliary supply pipe 152 of auxiliary cooling water circuit 150. Auxiliary supply pipe 152 of auxiliary cooling water circuit 150 may be coupled to and/or in fluid communication with an inlet portion or opening of filter 142. As such, and as discussed herein, filter 142 may receive the auxiliary cooling water from auxiliary supply header 148 via auxiliary supply pipe 152 and may filter out any contaminants from the auxiliary water before providing the auxiliary cooling water to another portion of auxiliary cooling water circuit 150.

Auxiliary cooling water circuit 150 of auxiliary cooling water system 144 may also include an auxiliary heat exchanger inlet pipe 154. As shown in FIGS. 2-9 auxiliary heat exchanger inlet pipe 154 may extend between filter 142 and heat exchanger 122. Specifically, auxiliary heat exchanger inlet pipe 154 may extend from filter 142 to heat exchanger 122, and may also fluidly couple filter 142 and heat exchanger 122. In the non-limiting example, auxiliary heat exchanger inlet pipe 154 may be coupled to and/or in fluid communication with the outlet portion or opening of filter 142. Auxiliary heat exchanger inlet pipe 154 may also be coupled to and/or in fluid communication with an inlet of heat exchanger 122. As discussed herein, filter 142 may discharge filtered, auxiliary cooling water through auxiliary heat exchanger inlet pipe 154, which in turn may provide the auxiliary cooling water to heat exchanger 122 to aid in the (re)cooling the cooling water included within closed cooling water system 124.

Additionally, auxiliary cooling water circuit 150 of auxiliary cooling water system 144 may include an auxiliary heat exchanger outlet pipe 156. In the non-limiting example shown in FIGS. 2-9, auxiliary heat exchanger outlet pipe 156 may extend between heat exchanger 122 and auxiliary return header 146. As shown in FIGS. 2-9, auxiliary heat exchanger outlet pipe 156 may extend substantially in the "X" direction from heat exchanger 122, and may also extend upward (e.g., "Z" direction) toward auxiliary return header 146. Auxiliary heat exchanger outlet pipe 156 may also fluidly couple heat exchanger 122 and auxiliary return header 146. Specifically, auxiliary heat exchanger outlet pipe 156 may be coupled to and/or in fluid communication with an outlet of heat exchanger 122, as well as auxiliary return header 146 of auxiliary cooling water system 144. As discussed herein, heat exchanger 122 may use the auxiliary cooling water to (re)cool cooling water included within the closed cooling water system 124, and may subsequently provide the auxiliary cooling water to auxiliary return header 146 via auxiliary heat exchanger outlet pipe 156.

The flow of the various cooling waters through closed cooling water system 124 and auxiliary cooling water system 144 of modular cooling water assembly 100 is discussed herein. With respect to closed cooling water system 124, cooling water previously utilized by portions of combined cycle power plant system 12 may flowing through closed cooling water system 124 and may be cooled by transferring heat to and/or being cooled by the auxiliary cooling water provided by auxiliary cooling water system 144 within heat exchanger 122. For example, cooling water previously supplied to portions of combined cycle power plant system 12, for example lube oil systems, water-pumps, and generators 28, 52 (see, FIG. 1), may be provided or flow to return header 126 via return conduit 70 (see, FIG. 1). Return header 126 of closed cooling water system 124 may then provide the previously used cooling water to supply pipe 132 of closed cooling water circuit 130. Supply pipe 132 may provide the previously used cooling water to pump 120, which in turn may provide the previously used cooling water to heat exchanger inlet pipe 134 of closed cooling water circuit 130 for closed cooling water system 124. In one example, at least a portion of the previously used cooling water may then flow to bypass header 138, via bypass conduit 140, and the remaining portion of the previously used cooling water may flow to heat exchanger 122. As discussed herein, bypass header 138 may be fluidly coupled to bypass headers of other modular cooling water assemblies to allow cooling water flowing through heat exchanger inlet pipe 134 to flow to other modular cooling water assemblies, and subsequently be cooled by heat exchangers of other modular cooling water assemblies. In another example, the previously used cooling water may flow directly to heat exchanger 122. Within heat exchanger 122, the previously used cooling water may be re-cooled using the auxiliary cooling water provided by auxiliary cooling water system 144. As a result, the cooling water leaving heat exchanger 122 and/or provided to heat exchanger outlet pipe 136 may be cooler than the cooling water entering heat exchanger 122 via heat exchanger inlet pipe 134. The re-cooled cooling water provided to heat exchanger outlet pipe 136 may flow to supply header 128, which in turn may provide the re-cooled cooling water to supply conduit 68 (see, FIG. 1) for use within combined cycle power plant system 12 (e.g., lube oil systems, water-pumps, generators 28, 52).

Simultaneous to the flow of cooling water through closed cooling water system 124, auxiliary cooling water may flow through auxiliary cooling water system 144 of modular cooling water assembly 100. As discussed herein, the auxiliary cooling water flowing through auxiliary cooling water system 144 may aid in cooling the cooling water of closed cooling water system 124 by absorbing heat from and/or cooling the cooling water of closed cooling water system 124 within heat exchanger 122. For example, auxiliary cooling water, provided to auxiliary cooling water system 144 via main cooling water supply conduit 65 (see, FIG. 1), may be provided to auxiliary supply header 148 via auxiliary supply conduit 72 (see, FIGS. 1 and 13-15). Auxiliary supply header 148 of auxiliary cooling water system 144 may then provide the auxiliary cooling water to auxiliary supply pipe 152 of auxiliary cooling water circuit 150. Supply pipe 152 may then provide the auxiliary water to filter 142. Filter 142 may receive and filter the auxiliary cooling water to ensure that any contaminants in the auxiliary water that may be harmful to heat exchanger 122 are removed or filtered out before providing the auxiliary cooling water to heat exchanger 122. Filter 142 may provide the filtered, auxiliary cooling water to auxiliary heat exchanger inlet pipe 154, which in turn may provide the filtered, auxiliary cooling water to heat exchanger 122. Within heat exchanger 122, the filtered, auxiliary cooling water of the auxiliary cooling water system 144 may be used to re-cool the previously used cooling water provided by closed cooling water system 124. For example, the filtered, auxiliary cooling water may be cooler than and/or may absorb some of the heat from the previously used cooling water supplied to the heat exchanger 122 via heat exchanger inlet pipe 134 of closed cooling water system 124. As a result, the auxiliary cooling water leaving heat exchanger 122 and/or provided to auxiliary heat exchanger outlet pipe 156 may be warmer than the auxiliary cooling water entering heat exchanger 122 via auxiliary heat exchanger inlet pipe 154. Additionally, the auxiliary cooling water leaving heat exchanger 122 and/or provided to auxiliary heat exchanger outlet pipe 156 may be warmer than the re-cooled cooling water discharged from heat exchanger 122 via heat exchanger outlet pipe 136 of closed cooling water circuit 130 for closed cooling water system 124. The auxiliary cooling water provided to auxiliary heat exchanger outlet pipe 156 may flow to return header 146, which in turn may provide the auxiliary cooling water to auxiliary return conduit 74 (see, FIGS. 1 and 13-15). Auxiliary return conduit 74 may then provide the auxiliary cooling water to main cooling water return conduit 66.

Figure 10:
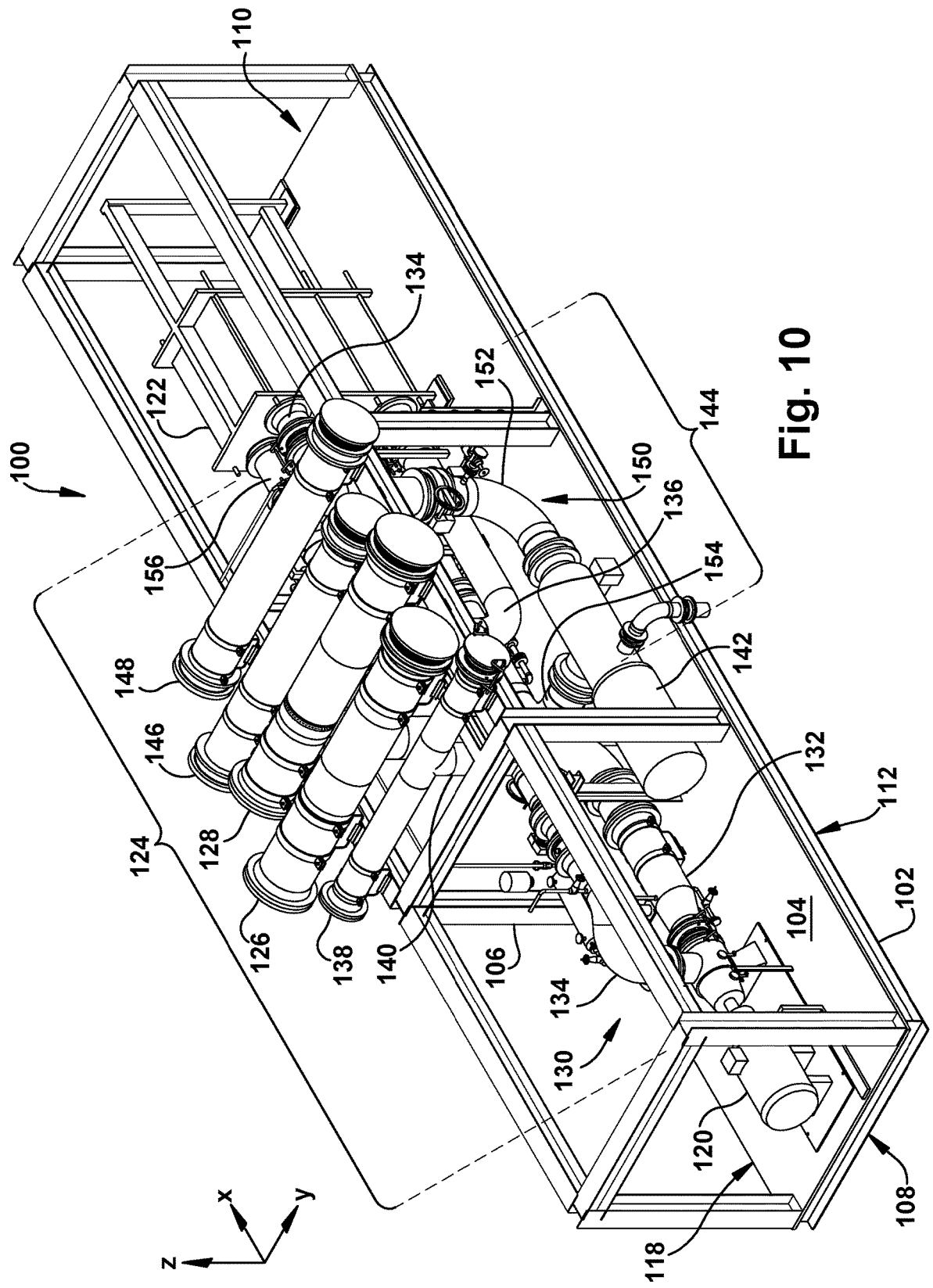
FIG. 10 shows an isometric view of a modular cooling water assembly utilized by the combined cycle power plant of FIG. 1, according to additional embodiments of the disclosure.
Figure 11:
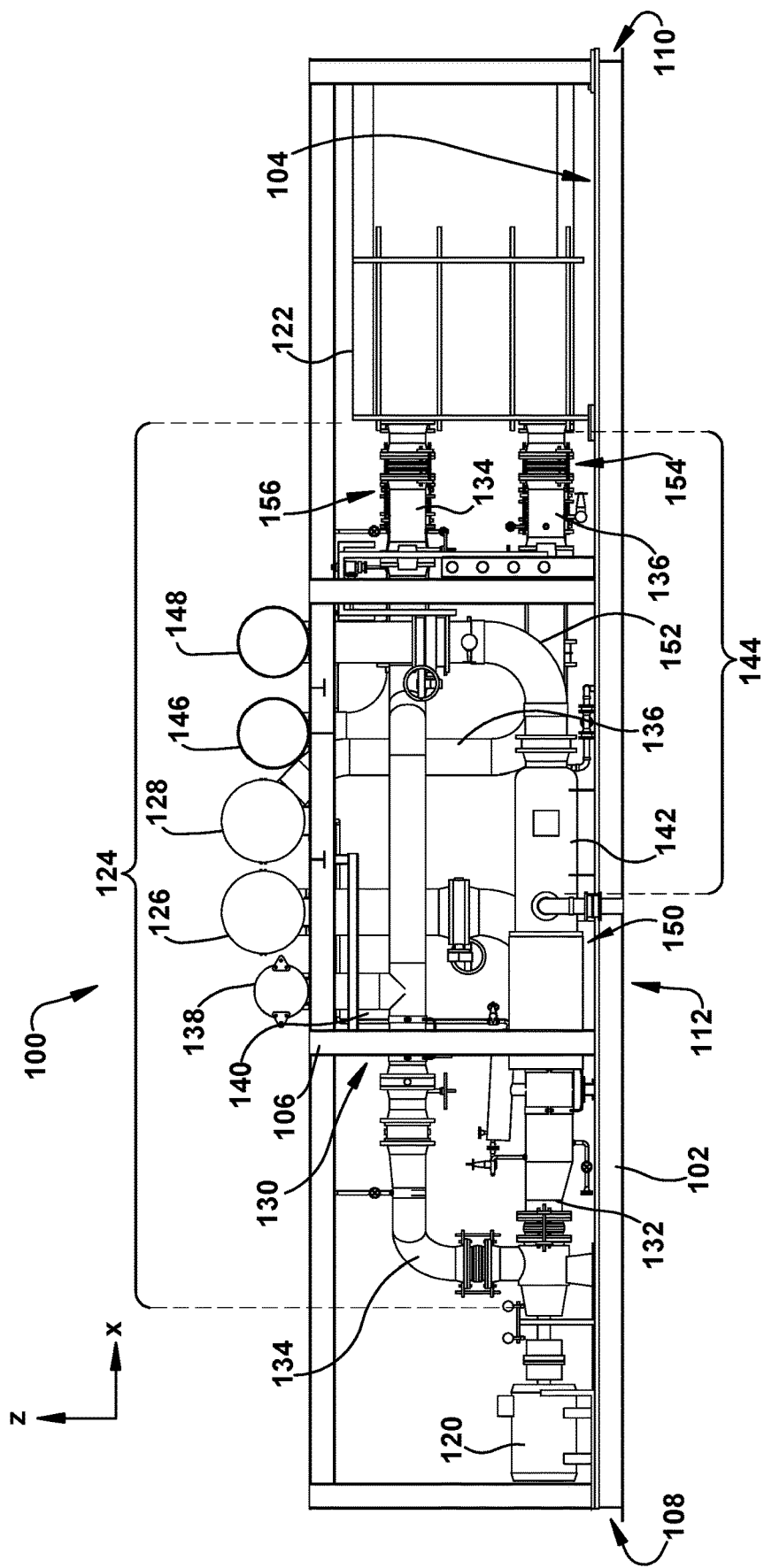
FIG. 11 shows a side view of the modular cooling water assembly of FIG. 10, according to embodiments of the disclosure.

FIGS. 10 and 11 show views of another non-limiting example of modular cooling water assembly 100 for combined cycle power plant system 12 of FIG. 1. Specifically, FIG. 10 shows an isometric view of modular cooling water assembly 100, and FIG. 11 shows a side view of modular cooling water assembly 100. It is understood that similarly numbered and/or named components may function in a substantially similar fashion. Redundant explanation of these components has been omitted for clarity.

In the non-limiting example shown in FIGS. 10 and 11, support structure 102 includes support frame 106 that may extend the length of base 104. That is, and with comparison to the non-limiting example shown in FIGS. 2-9, support frame 106 of support structure 102 for modular cooling water assembly 100 as shown in FIGS. 10 and 11 may include additional frames and/or beams. Specifically, and as shown in FIGS. 10 and 11, support frame 106 may be positioned, formed, and/or may extend in an "X" direction over the entire length of base 104, between first end 108 of base 104, and second end 110 of base 104. Support frame 106 may also be positioned, formed, and/or may extend in a "Y" direction over the entire width of base 104, between first side 112 of base 104 and second side 118 of base 104. In the non-limiting example, support frame 106 of support structure 102 may substantially surround, and provide support to at least a portion closed cooling water system 124 and auxiliary cooling water system 144 of modular cooling water assembly 100.

The non-limiting example of support frame 106 shown in FIGS. 10 and 11, may improve transportability of modular cooling water assembly 100. That is, the non-limiting configuration, the size, and/or inclusion of additional beams in support frame 106 of support structure 102 shown in FIGS. 10 and 11 may allow modular cooling water assembly 100 to be more easily moved, transported to, and/or positioned within combined cycle power plant system 12 by providing additional structures to be utilized to lift and/or move modular cooling water assembly 100. As discussed herein, a crane or a lift may be coupled to support frame 106 of support structure 102 to position modular cooling water assembly 100 within combined cycle power plant system 12 or put modular cooling water assembly 100 on a transportation vehicle.

Figure 12:
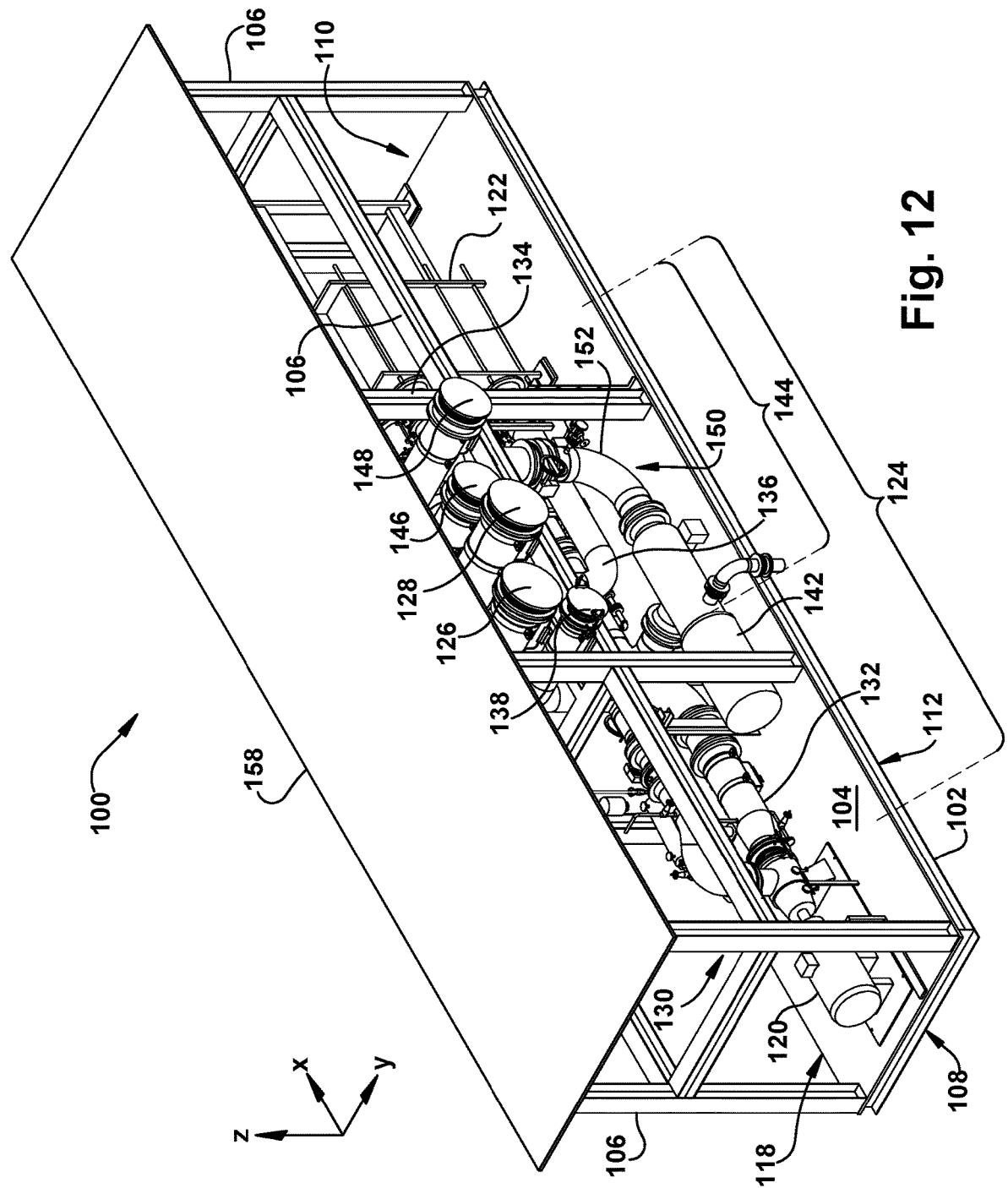
FIG. 12 shows an isometric view of the modular cooling water assembly of FIG. 10 including a platform, according to embodiments of the disclosure.

In addition to improving transportability, the non-limiting example of support frame 106 shown in FIGS. 10 and 11 may provide support to additional components and/or features. For example, and as shown in FIG. 12, the non-limiting example of support frame 106 that may be positioned, formed, and/or extend in an "X" direction over the entire length of base 104 may provide support to a platform or cover 158. That is, platform 158 may be positioned above, and/or supported by support frame 106 of support structure 102 for modular cooling water assembly 100 to provide a walkway for a user or operator of combined cycle power plant system 12. In a non-limiting example, platform 158 may be a "floor" or "walkway" for a user or operator of combined cycle power plant system 12. The inclusion of platform 158 may allow for modular cooling water assembly 100 to be positioned in a space that may not require constant access by a user or operator of combined cycle power plant system 12. If needed (e.g., maintenance), and as a result of the openness of support frame 106, the various components of modular cooling water assembly 100 may be easily accessible to the user or operator of combined cycle power plant system 12 by just allowing access to modular cooling water assembly 100 below platform 158. Additionally or alternatively, platform 158 may provide a surface or structure that may receive and/or support additional components of combined cycle power plant system 12 and/or components that may be utilized by combined cycle power plant system 12.

Figure 13:
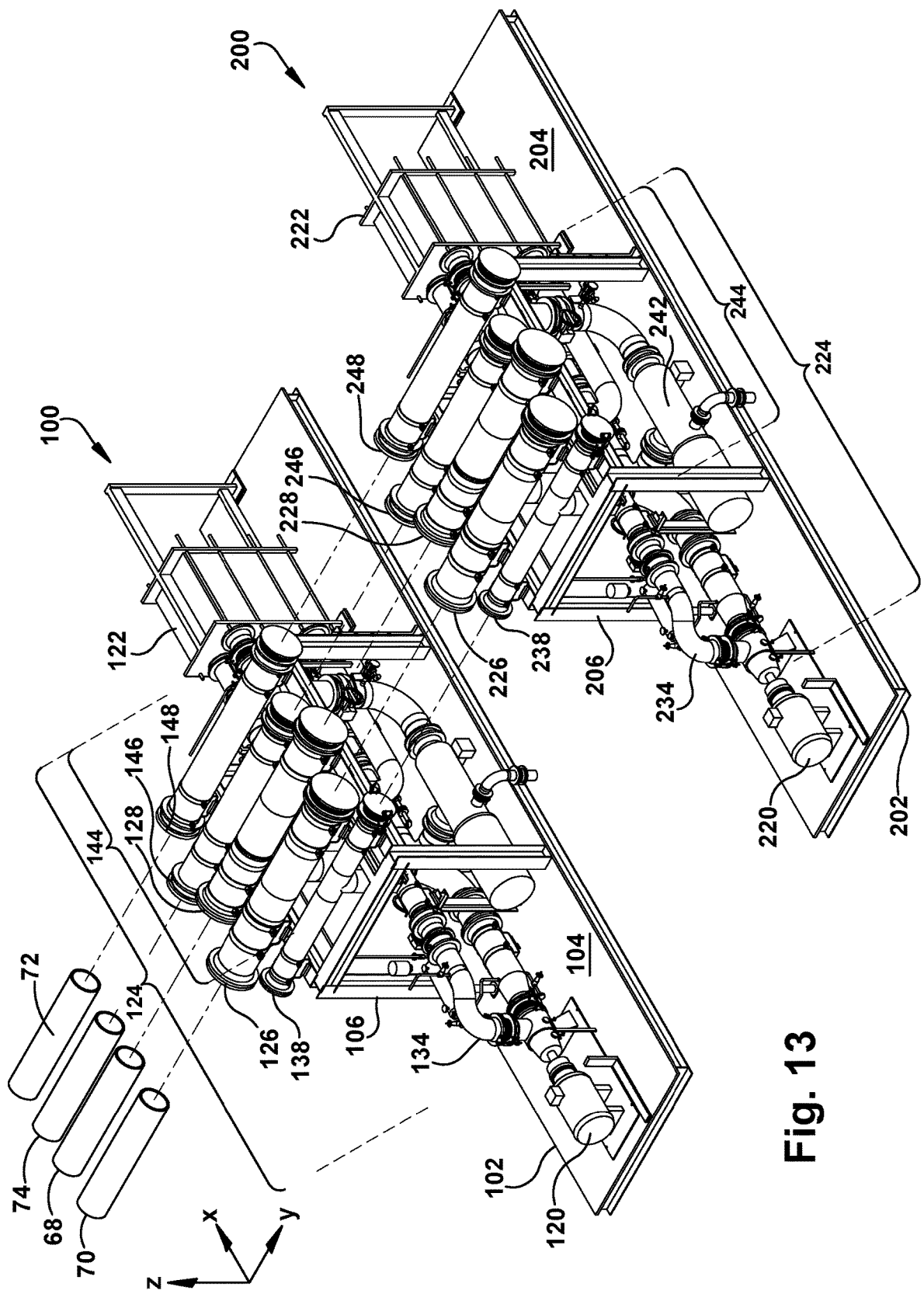
FIG. 13 shows a semi-exploded isometric view of the first modular cooling water assembly of FIG. 2 and a second modular cooling water assembly utilized by the combined cycle power plant of FIG. 1, according to embodiments of the disclosure.
Figure 14:
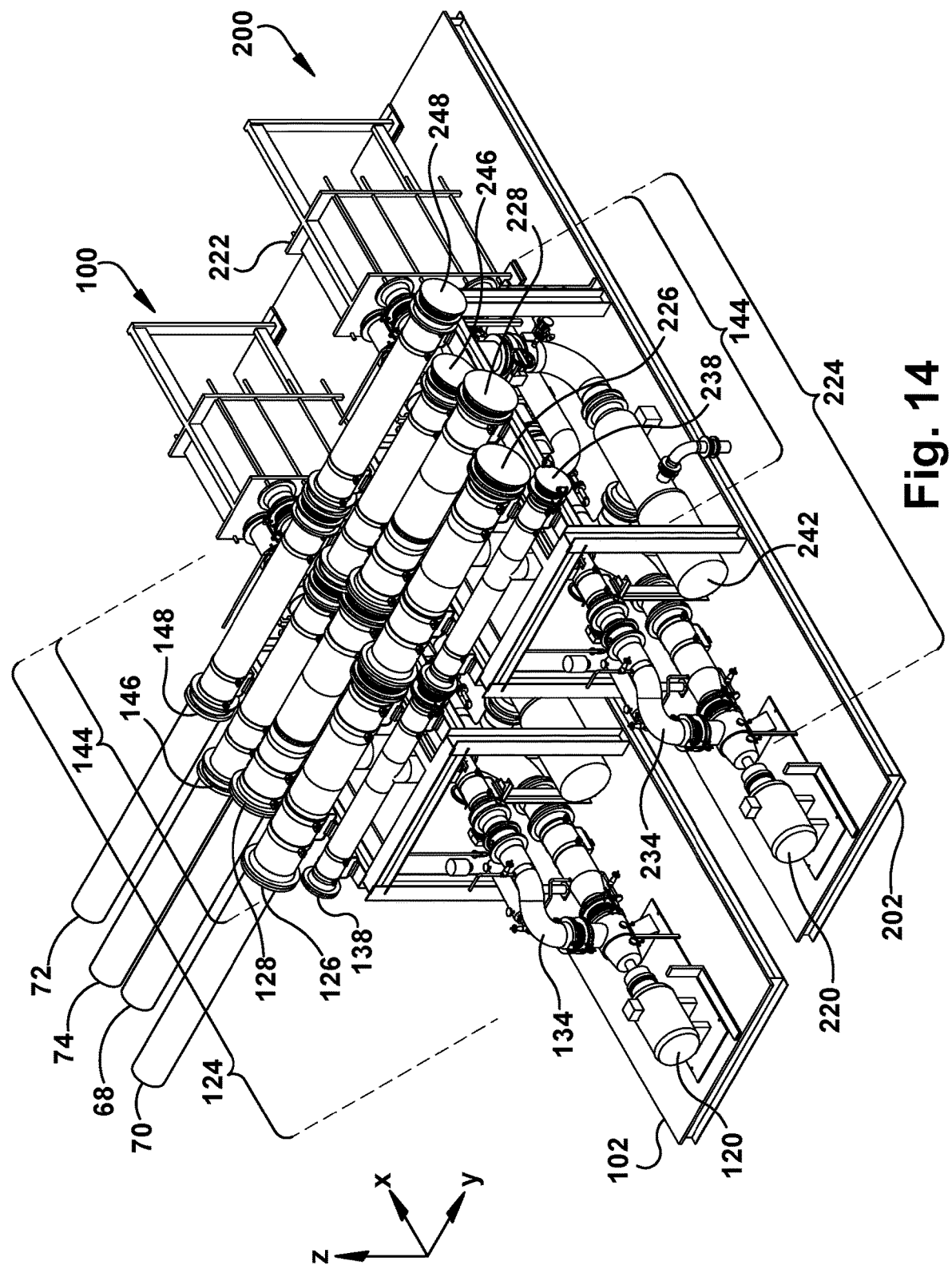
FIG. 14 shows an isometric view of the first modular cooling water assembly and the second modular cooling water assembly of FIG. 13, according to embodiments of the disclosure.
Figure 15:
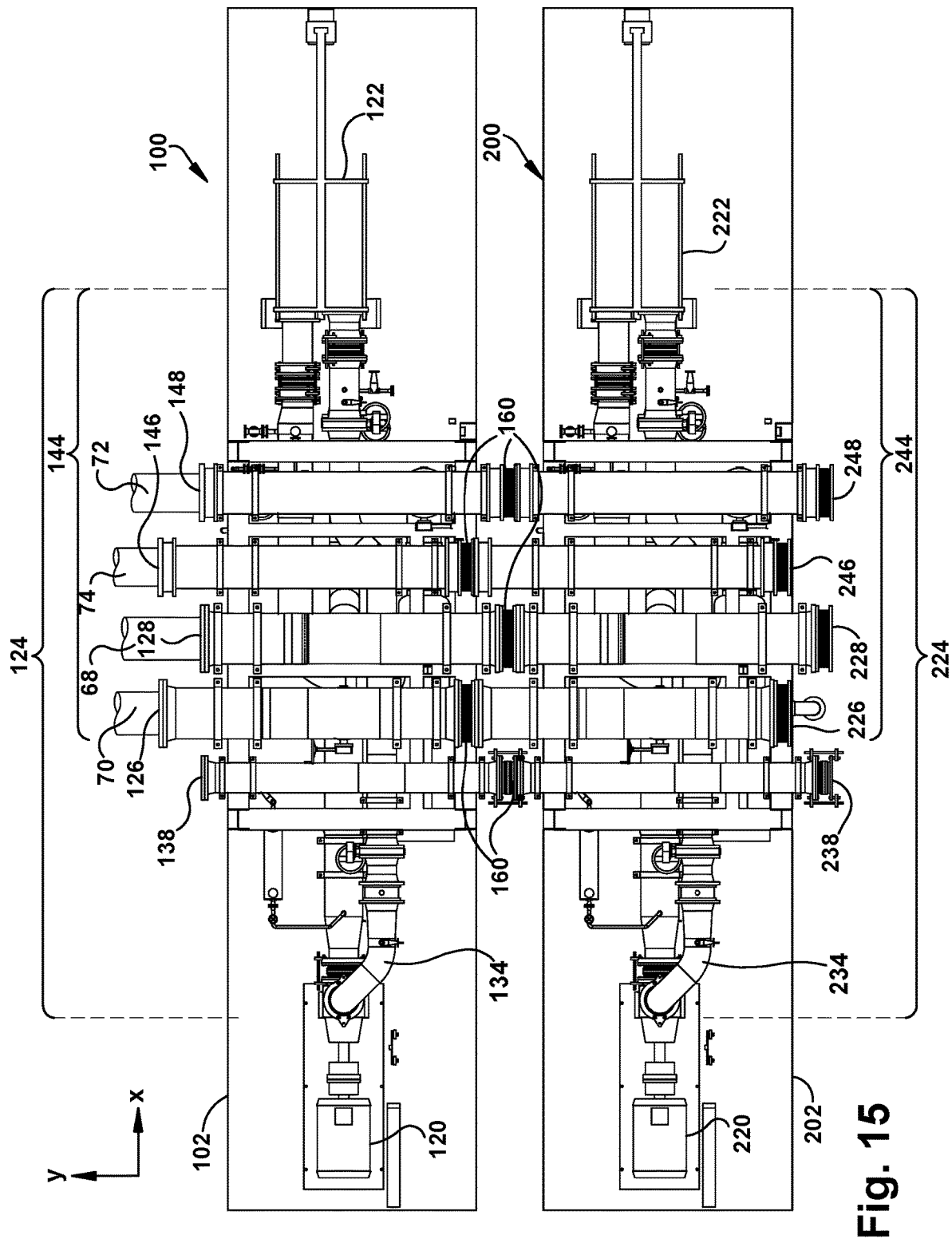
FIG. 15 shows a top view of the first modular cooling water assembly and the second modular cooling water assembly of FIG. 13, according to embodiments of the disclosure.

FIGS. 13-15 show various views of first modular cooling water assembly 100 and a second modular cooling water assembly 200 that may be utilized by combined cycle power plant system 12. Specifically, FIG. 13 shows a semi-exploded, isometric view of first modular cooling water assembly 100 and second modular cooling water assembly 200, FIG. 14 shows an isometric view of first modular cooling water assembly 100 fluidly coupled to second modular cooling water assembly 200, and FIG. 15 shows a top view of first modular cooling water assembly 100 fluidly coupled to second modular cooling water assembly 200.

First modular cooling water assembly 100 and second modular cooling water assembly 200 may be substantially similar to modular cooling water assembly 100 discussed herein with respect to FIGS. 2-9. As such, second modular cooling water assembly 200 shown in FIGS. 13-15 may be substantially similar and/or identical to first modular cooling water assembly 100. Additionally, both first modular cooling water assembly 100 and second modular cooling water assembly 200 may include the same features and/or components including, but not limited to, support structure 102, 202, pump 120, 220, heat exchanger 122, 222, closed cooling water system 124, 224, bypass header 138, 238, filter 142, 242, and auxiliary cooling water system 144, 244. It is understood that similarly numbered and/or named components may function in a substantially similar fashion. Redundant explanation of these components has been omitted for clarity.

In the non-limiting example shown in FIGS. 13-15, first modular cooling water assembly 100 and second modular cooling water assembly 200 may be combined and/or in fluid communication with one another to increase the output capacity and/or provide more cooling water to combined cycle power plant system 12. As discussed herein, first modular cooling water assembly 100 and second modular cooling water assembly 200 are easily transported. Additionally, and as discussed herein, each of first modular cooling water assembly 100 and second modular cooling water assembly 200 includes the necessary components, structures, and/or features to function independently to provide cooling water to combined cycle power plant system 12. As a result, first modular cooling water assembly 100 and second modular cooling water assembly 200 may be combined without the need of major re-tooling or reworking to increase the output capacity and/or provide more cooling water to combined cycle power plant system 12 where the demand and/or load of combined cycle power plant system 12 requires greater output and/or more cooling water.

As shown in FIGS. 13-15, the various headers of first modular cooling water assembly 100 and second modular cooling water assembly 200 may be fluidly coupled to combine and/or put first modular cooling water assembly 100 in fluid communication with second modular cooling water assembly 200. To aid in the coupling between the various headers of first modular cooling water assembly 100 and second modular cooling water assembly 200, expansion pipes or bellows 160 (see, FIG. 15) may be positioned between and/or may fluidly couple each header of first modular cooling water assembly 100 to the corresponding header of second modular cooling water assembly 200.

In the non-limiting example shown in FIGS. 13-15, return header 126 of closed cooling water system 124 for first modular cooling water assembly 100 may be fluidly coupled to return header 226 of closed cooling water system 224 for second modular cooling water assembly 200, and supply header 128 of closed cooling water system 124 for first modular cooling water assembly 100 may be fluidly coupled to supply header 228 of closed cooling water system 224 for second modular cooling water assembly 200. Additionally as shown in FIGS. 13-15, return header 126 of closed cooling water system 124 for first modular cooling water assembly 100 may be fluidly coupled to return conduit 70, and supply header 128 of closed cooling water system 124 for first modular cooling water assembly 100 may be fluidly coupled to supply conduit 68, as discussed herein. Bypass header 138 of closed cooling water system 124 for first modular cooling water assembly 100 may be fluidly coupled to bypass header 238 of closed cooling water system 224 for second modular cooling water assembly 200.

Furthermore, auxiliary return header 146 of auxiliary cooling water system 144 for first modular cooling water assembly 100 may be fluidly coupled to auxiliary return header 246 of auxiliary cooling water system 244 for second modular cooling water assembly 200, and auxiliary supply header 148 of auxiliary cooling water system 144 for first modular cooling water assembly 100 may be fluidly coupled to auxiliary supply header 248 of auxiliary cooling water system 244 for second modular cooling water assembly 200. As shown in FIGS. 13-15, auxiliary return header 146 of auxiliary cooling water system 144 for first modular cooling water assembly 100 may be fluidly coupled to auxiliary return conduit 74, and auxiliary supply header 148 of auxiliary cooling water system 144 for first modular cooling water assembly 100 may be fluidly coupled to auxiliary supply conduit 72, as discussed herein.

During operation, first modular cooling water assembly 100 and second modular cooling water assembly 200 may move cooling water and auxiliary cooling water through the various components, systems and/or circuits of each assembly as similarly discussed herein with respect to the non-limiting example shown in FIGS. 2-9. However, distinct from the non-limiting example of FIGS. 2-9, the cooling water and auxiliary cooling water entering mix before being provided to first modular cooling water assembly 100 and second modular cooling water assembly 200 and/or after being discharged from first modular cooling water assembly 100 and second modular cooling water assembly 200. For example, previously used cooling water flowing through return conduit 70 may be provided to both first modular cooling water assembly 100 and second modular cooling water assembly 200. Specifically, the previously used cooling water flowing through return conduit 70 may flow to return header 126 of closed cooling water system 124 for first modular cooling water assembly 100, and then may subsequently flow from return header 126 to return header 226 of closed cooling water system 224 for second modular cooling water assembly 200. In the non-limiting example, return header 126 and return header 226 may each receive a portion of the previously used cooling water to provide to their respective closed cooling water system 124, 224.

Similarly, (re)cooled cooling water provided to supply conduit 68 may be a combination of cooling water provided from first modular cooling water assembly 100 and second modular cooling water assembly 200. That is, supply header 228 of second modular cooling water assembly 200 may provide (re)cooled cooling water to supply header 128, which in turn may also include (re)cooled cooling water from first modular cooling water assembly 100. Within supply header 128 of first modular cooling water assembly 100, the (re)cooled cooling water from supply header 228 of second modular cooling water assembly 200 may mix with the (re)cooled cooling water included within supply header 128 of first modular cooling water assembly 100. As such, supply header 128 of first modular cooling water assembly 100 may provide a mixture or combination of (re)cooled cooling water to supply conduit 68.

The auxiliary cooling water flowing through auxiliary return header 146/auxiliary supply header 148 of first modular cooling water assembly 100 and auxiliary return header 246/auxiliary supply header 248 of second modular cooling water assembly 200 may operate and/or function (e.g., mixing cooling water) in a substantially similar fashion as discussed herein with respect to return header 126/supply header 128 of first modular cooling water assembly 100 and return header 226/supply header 228 of second modular cooling water assembly 200. Redundant explanation of these components and/or operation has been omitted for clarity.

As discussed herein, bypass headers 138, 238 may exchange cooling water between first modular cooling water assembly 100 and second modular cooling water assembly 200. Specifically, bypass headers 138, 238 may be used to exchange previously used cooling water between closed cooling water circuit 124 of first modular cooling water assembly 100 and closed cooling water circuit 224 of second modular cooling water assembly 200. As shown in FIGS. 13-15, and as discussed herein, bypass header 138 may be fluidly coupled to heat exchanger inlet pipe 134 of closed cooling water circuit 124 for first modular cooling water assembly 100. Additionally, bypass header 238 may be fluidly coupled to heat exchanger inlet pipe 234 of closed cooling water circuit 224 for second modular cooling water assembly 200. In a non-limiting example, a portion of previously used cooling water flowing through heat exchanger inlet pipe 134 of closed cooling water circuit 124 for first modular cooling water assembly 100 may be provided to bypass header 138. Bypass header 138 may then provide the portion of previously used cooling water from first modular cooling water assembly 100 to second modular cooling water assembly 200 via bypass header 238. Bypass header 238 may receive the previously used cooling water from first modular cooling water assembly 100 and may provide it to heat exchanger inlet pipe 234 of closed cooling water circuit 224 for second modular cooling water assembly 200. This portion of previously used cooling water from first modular cooling water assembly 100 may then flow through heat exchanger inlet pipe 234 to heat exchanger 222 of second modular cooling water assembly 200, which in turn may re-cool the cooling water as discussed herein. A portion of previously used cooling water from first modular cooling water assembly 100 may be provided to second modular cooling water assembly 200 via bypass headers 138, 238 when, for example, first modular cooling water assembly 100 is receiving a maximum amount of previously used cooling water, and/or when second modular cooling water assembly 200 is not receiving a desired amount of previously used cooling water. Providing a portion of previously used cooling water from first modular cooling water assembly 100 to second modular cooling water assembly 200, via bypass headers 138, 238, may ensure the previously used cooling water is adequately re-cooled to a desired temperature, before being provided back to combined cycle power plant system 12 via supply conduit 68, as discussed herein.

In addition to providing increased output capacity and/or providing more cooling water to portions of combined cycle power plant system 12 (e.g., lube oil system, water-pump, generators 28, 52), the use of the combination of first modular cooling water assembly 100 and second modular cooling water assembly 200 may also allow for cooling water to continue to be provide to portions of combined cycle power plant system 12 when performing maintenance on one of first modular cooling water assembly 100 or second modular cooling water assembly 200. That is, if maintenance needs to be performed on certain portions of first modular cooling water assembly 100 or second modular cooling water assembly 200, that specific assembly may be shutdown (e.g., in operable) but the other modular cooling water assembly may maintain operation and/or may continue to provide cooling water to portions of combined cycle power plant system 12. For example, if second modular cooling water assembly 200 must be shutdown or inoperable due to maintenance, first modular cooling water assembly 100 may continue to operate. Additionally through valves included within first modular cooling water assembly 100 and second modular cooling water assembly 200, cooling water and/or auxiliary cooling water may be temporarily prevented (e.g., closed valves) from being provided to and/or flowing to second modular cooling water assembly 200 when performing maintenance.

In another non-limiting example where first modular cooling water assembly 100 must be shutdown or inoperable due to maintenance, second modular cooling water assembly 200 may continue to operate. In this non-limiting example valves included within first modular cooling water assembly 100 may temporarily prevent cooling water and/or auxiliary cooling water from being provided to and/or flowing through portions of first modular cooling water assembly 100 when performing maintenance. For example, valves positioned on supply pipe 132 and heat exchanger outlet pipe 136 of closed cooling water system 124 may be shut to prevent cooling water from flowing through closed cooling water system 124, pump 120 and/or heat exchanger 122 of first modular cooling water assembly 100. Because of the position of the valves, return header 126 and supply header 128 may remain open and/or in fluid communication with return header 226 and supply header 228 of second modular cooling water assembly 200. As such, while maintenance is being perform on first modular cooling water assembly 100 (e.g., heat exchanger 122) and first modular cooling water assembly 100 is shutdown or inoperable due to maintenance, return header 126 of first modular cooling water assembly 100 may remain open to allow previously used cooling water to flow from return conduit 70 to return header 226 of second modular cooling water assembly 200. Additionally, supply header 128 of first modular cooling water assembly 100 may remain open to allow re-cooled cooling water to flow from supply header 228 of second modular cooling water assembly 200 to supply conduit 68.

During maintenance and/or shutdown of first modular cooling water assembly 100 or second modular cooling water assembly 200, the auxiliary cooling water flowing through auxiliary return headers 146, 246/auxiliary supply headers 148, 248 may operate and/or function (e.g., mixing cooling water) in a substantially similar fashion as discussed herein with respect to return headers 126, 226/supply headers 128, 228. Redundant explanation of these components and/or operation has been omitted for clarity.

Figure 16:
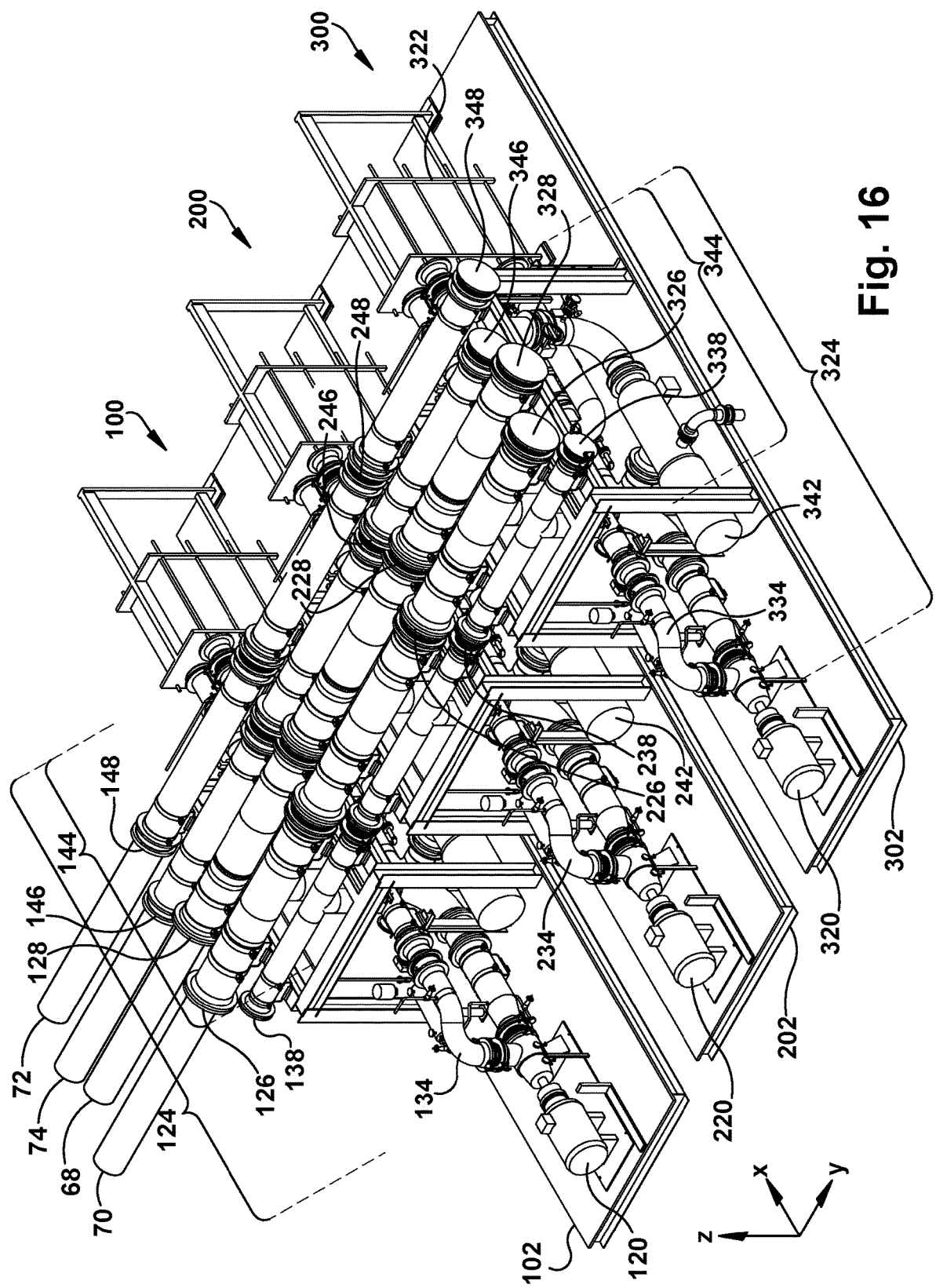
FIG. 16 shows an isometric view of the first modular cooling water assembly and the second modular cooling water assembly of FIG. 13, as well as a third modular cooling water assembly, according to embodiments of the disclosure.
Figure 17:
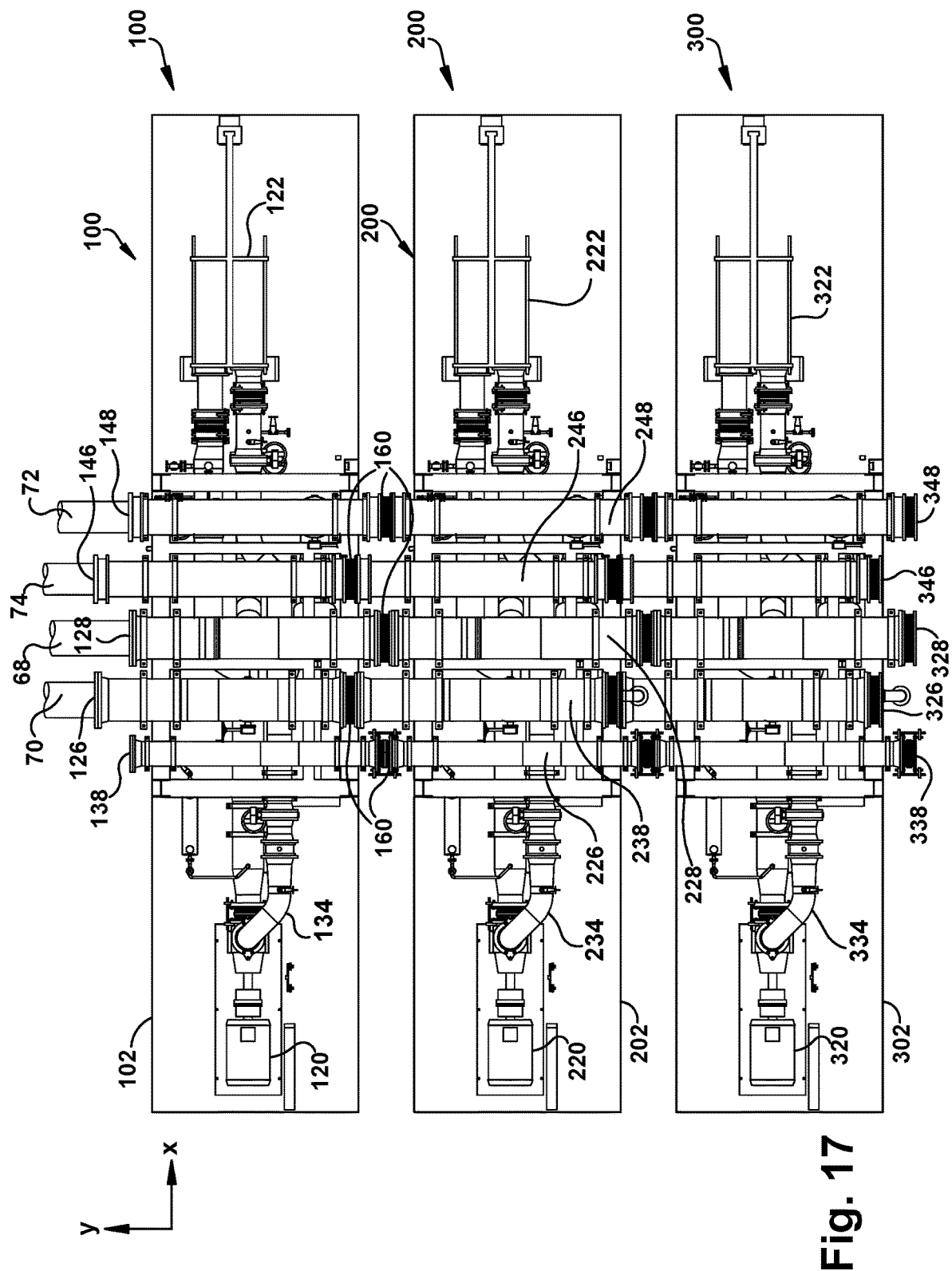
FIG. 17 shows a top view of the first modular cooling water assembly, the second modular cooling water assembly, and the third modular cooling water assembly of FIG. 16, according to embodiments of the disclosure.

FIGS. 16 and 17 show various views of first modular cooling water assembly 100, second modular cooling water assembly 200, and a third modular cooling water assembly 300 that may be utilized by combined cycle power plant system 12. Specifically, FIG. 16 shows an isometric view of first modular cooling water assembly 100 fluidly coupled to second modular cooling water assembly 200, and second modular cooling water assembly 200 fluidly coupled to third modular cooling water assembly 300, and FIG. 17 shows a top view of first modular cooling water assembly 100 fluidly coupled to second modular cooling water assembly 200, and second modular cooling water assembly 200 fluidly coupled to third modular cooling water assembly 300.

Third modular cooling water assembly 300 may be substantially similar to modular cooling water assembly 100 discussed herein with respect to FIGS. 2-9, and may be substantially similar and/or identical to first modular cooling water assembly 100 and second modular cooling water assembly 200, respectively. Additionally, third modular cooling water assembly 300 may include the same features and/or components as first modular cooling water assembly 100, and second modular cooling water assembly 200 including, but not limited to, support structure 302, pump 320, heat exchanger 322, closed cooling water system 324, bypass header 338, filter 342, and auxiliary cooling water system 344. It is understood that similarly numbered and/or named components may function in a substantially similar fashion. Redundant explanation of these components has been omitted for clarity.

Similar to the non-limiting exampled discussed herein with respect to FIGS. 13-15, the various headers of second modular cooling water assembly 200 and third modular cooling water assembly 300 may be fluidly coupled to combine and/or put second modular cooling water assembly 200 in fluid communication with third modular cooling water assembly 300. To aid in the coupling between the various headers of second modular cooling water assembly 200 and third modular cooling water assembly 300, expansion pipes or bellows 160 (see, FIG. 17) may be positioned between and/or may fluidly couple each header of second modular cooling water assembly 200 to the corresponding header of third modular cooling water assembly 300.

In the non-limiting example shown in FIGS. 16 and 17, return header 226 of closed cooling water system 224 for second modular cooling water assembly 200 may be fluidly coupled to return header 326 of closed cooling water system 324 for third modular cooling water assembly 300. Supply header 228 of closed cooling water system 224 for second modular cooling water assembly 200 may be fluidly coupled to supply header 328 of closed cooling water system 324 for third modular cooling water assembly 300. Additionally as shown in FIGS. 16 and 17, and similar to FIGS. 13-15, return header 126 of closed cooling water system 124 for first modular cooling water assembly 100 may be fluidly coupled to return conduit 70, and supply header 128 of closed cooling water system 124 for first modular cooling water assembly 100 may be fluidly coupled to supply conduit 68, as discussed herein. Bypass header 238 of closed cooling water system 224 for second modular cooling water assembly 200 may be fluidly coupled to bypass header 338 of closed cooling water system 324 for third modular cooling water assembly 300. Furthermore, auxiliary return header 246 of auxiliary cooling water system 244 for second modular cooling water assembly 200 may be fluidly coupled to auxiliary return header 346 of auxiliary cooling water system 344 for third modular cooling water assembly 300. Auxiliary supply header 248 of auxiliary cooling water system 244 for second modular cooling water assembly 200 may be fluidly coupled to auxiliary supply header 348 of auxiliary cooling water system 344 for third modular cooling water assembly 300.

In the non-limiting examples discussed herein the various headers (e.g., return header 126, supply header 128, bypass header 138, auxiliary return header 146, auxiliary supply header 148) for the modular cooling water assemblies are shown to be substantially linear in the "Y" direction (e.g., not bent), and may be in substantially the same level, height, and/or plane in the "Z" direction. Additionally, the various headers for each modular cooling water assembly may be linearly aligned with corresponding headers for another modular cooling water assembly. In other non-limiting examples, it is understood that at least some of the headers for each modular cooling water assembly may be bent, offset, and/or raised in the "Z" direction. Offsetting (e.g., bending at least a portion and/or raising) at least some of the headers may ease in the coupling of the headers to other components (e.g., headers for other modular cooling water assemblies, supply conduits, return conduits, and the like). For example, offsetting first return header 126 and/or first auxiliary return header 146 in the "Z" direction from support frame 106, may provide more space to an operator of modular cooling water assembly 100 when coupling first headers 126, 128, 138, 146, 148 of first modular cooling water assembly 100 to corresponding headers 226, 228, 238, 246, 248 of second modular cooling water assembly 200. The additional space may allow the operator to more easily access each header, and in turn, may ease the coupling process between first headers 126, 128, 138, 146, 148 of first modular cooling water assembly 100 and corresponding headers 226, 228, 238, 246, 248 of second modular cooling water assembly 200.

Although discussed and shown herein as including one, two, or three modular cooling water assemblies, it is understood that combined cycle power plant system 12 may utilize any number of modular cooling water assembly during operation. That is, the number of modular cooling water assemblies shown and discussed herein is illustrative. As such, combined cycle power plant system 12 may include more or less modular cooling water assemblies than the number assemblies shown herein. The number of modular cooling water assemblies included within and utilized by combined cycle power plant system 12 may be dependent, at least in part, on the amount of cooling water required by combined cycle power plant system 12, as discussed herein.

Technical effect is to provide modular cooling water assemblies that are easily transported, take up minimal space within a power plant, and/or can be combined and/or fluidly coupled to one another to more easily increase the output capacity for providing cooling water to the power plant.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A cooling water assembly for a combined cycle power plant system, the cooling water assembly comprising:
    a support structure;
    a pump positioned on the support structure;
    a heat exchanger positioned on the support structure; and
    a closed cooling water system supported by the support structure, the closed cooling water system including:
        a return header positioned above the support structure, the return header fluidly coupled to a return conduit of the combined cycle power plant system for receiving cooling water previously utilized by the combined cycle power plant system;
        a supply header positioned adjacent the return header, the supply header fluidly coupled to a supply conduit of the combined cycle power plant system for supplying the cooling water to the combined cycle power plant system;
        a closed cooling water circuit fluidly coupling the return header to the supply header, the closed cooling water circuit fluidly coupled to the heat exchanger and the pump; and
        a bypass header in fluid communication with the closed cooling water circuit, the bypass header positioned adjacent the return header.

2. The cooling water assembly of claim 1, wherein the supply header of the closed cooling water system extends substantially parallel to the return header.

3. The cooling water assembly of claim 1, wherein the bypass header of the closed cooling water system extends substantially parallel to the supply header.

4. The cooling water assembly of claim 1, wherein the closed cooling water circuit further comprises:

a supply pipe extending between and fluidly coupling the return header and the pump, the supply pipe providing the cooling water from the return header to the pump;

a heat exchanger inlet pipe extending between and fluidly coupling the pump and the heat exchanger, the heat exchanger inlet pipe providing the cooling water from the pump to the heat exchanger; and a heat exchanger outlet pipe extending between and fluidly coupling the heat exchanger and the supply header, the heat exchanger outlet pipe providing the cooling water from the heat exchanger to the supply header.

5. The cooling water assembly of claim 4, wherein the supply header of the closed cooling water system extends substantially perpendicular to the heat exchanger outlet pipe of the closed cooling water circuit.

6. The cooling water assembly of claim 1, further comprising:

a filter positioned on the support structure; and an auxiliary cooling water system supported by the support structure, the auxiliary cooling water system including:

an auxiliary return header positioned adjacent the supply header of the closed cooling water system, the auxiliary return header fluidly coupled to an auxiliary return conduit of the combined cycle power plant system for providing auxiliary cooling water to the auxiliary return conduit;

an auxiliary supply header positioned adjacent the auxiliary return header, the auxiliary supply header fluidly coupled to an auxiliary supply conduit of the combined cycle power plant system for receiving the auxiliary cooling water for the auxiliary cooling water system; and an auxiliary cooling water circuit fluidly coupling the auxiliary supply header to the auxiliary return header, the auxiliary cooling water circuit fluidly coupled to the filter and the heat exchanger.

7. The cooling water assembly of claim 6, wherein the auxiliary cooling water circuit further comprises:

an auxiliary supply pipe extending between and fluidly coupling the auxiliary supply header and the filter, the auxiliary supply pipe providing the auxiliary cooling water from the auxiliary supply header to the filter;

an auxiliary heat exchanger inlet pipe extending between and fluidly coupling the filter and the heat exchanger, the auxiliary heat exchanger inlet pipe providing the auxiliary cooling water from the filter to the heat exchanger; and an auxiliary heat exchanger outlet pipe extending between and fluidly coupling the heat exchanger and the auxiliary return header, the auxiliary heat exchanger outlet pipe providing the auxiliary cooling water from the heat exchanger to the auxiliary return header.

8. The cooling water assembly of claim 7, wherein the auxiliary supply header of the auxiliary cooling water system extends substantially perpendicular to the auxiliary supply pipe of the auxiliary cooling water circuit.

9. The cooling water assembly of claim 7, wherein the auxiliary supply header of the auxiliary cooling water system extends substantially parallel to:

the auxiliary return header of the auxiliary cooling water system; and the supply header of the closed cooling water system.

10. A cooling water system for a combined cycle power plant system, the cooling water system, comprising:

a first modular cooling water assembly including:

a first support structure;

a first pump positioned on the first support structure;

a first heat exchanger positioned on the first support structure; and a first closed cooling water system supported by the first support structure, the first closed cooling water system including:

a first return header positioned above the first support structure, the first return header fluidly coupled to a return conduit of the combined cycle power plant system for receiving cooling water previously utilized by the combined cycle power plant system;

a first supply header positioned adjacent the first return header, the first supply header fluidly coupled to a supply conduit of the combined cycle power plant system for supplying the cooling water to the combined cycle power plant system;

a first closed cooling water circuit fluidly coupling the first return header to the first supply header, the first closed cooling water circuit fluidly coupled to the first heat exchanger and the first pump; and a first bypass header in fluid communication with the first closed cooling water circuit, the first bypass header positioned adjacent the first return header; and a second modular cooling water assembly positioned adjacent and fluidly coupled to the first modular cool water assembly, the second modular cooling water assembly including:

a second support structure positioned adjacent the first support structure of the first modular cooling water assembly;

a second pump positioned on the second support structure;

a second heat exchanger positioned on the second support structure; and a second closed cooling water system supported by the second support structure and in fluid communication with the first closed cooling water system of the first modular cooling water assembly, the second closed cooling water system including:

a second return header fluidly coupled to the first return header of the first closed cooling water system, the second return header receiving cooling water from the first return header of the first closed cooling water system;

a second supply header positioned adjacent the second return header, the second supply header fluidly coupled to the first supply header of the first closed cooling water system for supplying cooling water to the first supply header; and a second closed cooling water circuit fluidly coupling the second return header to the second supply header, the second closed cooling water circuit fluidly coupled to the second heat exchanger and the second pump.

11. The cooling water system of claim 10, wherein the first supply header of the first closed cooling water system extends substantially parallel to the first return header, and wherein the second supply header of the second closed cooling water system extends substantially parallel to the second return header.

12. The cooling water system of claim 10, wherein the second closed cooling water system further comprises:

a second bypass header in fluid communication with the second closed cooling water circuit and the first bypass header of the first closed cooling water system, the second bypass header positioned adjacent the second return header.

13. The cooling water system of claim 10, wherein the first closed cooling water circuit further comprises:
a first supply pipe extending between and fluidly coupling the first return header and the first pump, the first supply pipe providing the cooling water from the first return header to the first pump;
a first heat exchanger inlet pipe extending between and fluidly coupling the first pump and the first heat exchanger, the first heat exchanger inlet pipe providing the cooling water from the first pump to the first heat exchanger; and
a first heat exchanger outlet pipe extending between and fluidly coupling the first heat exchanger and the first supply header, the first heat exchanger outlet pipe providing the cooling water from the first heat exchanger to the first supply header.

14. The cooling water system of claim 13, wherein the second closed cooling water circuit further comprises:
a second supply pipe extending between and fluidly coupling the second return header and the second pump, the second supply pipe providing the cooling water from the second return header to the second pump;
a second heat exchanger inlet pipe extending between and fluidly coupling the second pump and the second heat exchanger, the second heat exchanger inlet pipe providing the cooling water from the second pump to the second heat exchanger; and
a second heat exchanger outlet pipe extending between and fluidly coupling the second heat exchanger and the second supply header, the second heat exchanger outlet pipe providing the cooling water from the second heat exchanger to the second supply header.

15. The cooling water system of claim 10, wherein the first modular cooling water assembly further comprises:
a first filter positioned on the first support structure; and
a first auxiliary cooling water system supported by the first support structure, the first auxiliary cooling water system including:
a first auxiliary return header positioned adjacent the first supply header of the first closed cooling water system, the first auxiliary return header fluidly coupled to an auxiliary return conduit of the combined cycle power plant system for providing auxiliary cooling water to the auxiliary return conduit;
a first auxiliary supply header positioned adjacent the first auxiliary return header, the first auxiliary supply header fluidly coupled to an auxiliary supply conduit of the combined cycle power plant system for receiving the auxiliary cooling water for the auxiliary cooling water system; and
a first auxiliary cooling water circuit fluidly coupling the first auxiliary supply header to the first auxiliary return header, the first auxiliary cooling water circuit fluidly coupled to the first filter and the first heat exchanger.

16. The cooling water system of claim 15, wherein the first auxiliary cooling water circuit of the first modular cooling water assembly further comprises:
a first auxiliary supply pipe extending between and fluidly coupling the first auxiliary supply header and the first filter, the first auxiliary supply pipe providing the auxiliary cooling water from the first auxiliary supply header to the first filter;
a first auxiliary heat exchanger inlet pipe extending between and fluidly coupling the first filter and the first heat exchanger, the first auxiliary heat exchanger inlet pipe providing the auxiliary cooling water from the first filter to the first heat exchanger; and
a first auxiliary heat exchanger outlet pipe extending between and fluidly coupling the first heat exchanger and the first auxiliary return header, the first auxiliary heat exchanger outlet pipe providing the auxiliary cooling water from the first heat exchanger to the first auxiliary return header.

17. The cooling water system of claim 15, wherein the second modular cooling water assembly further comprises:
a second filter positioned on the second support structure; and
a second auxiliary cooling water system supported by the second support structure, the second auxiliary cooling water system including:
a second auxiliary return header positioned adjacent the second supply header of the second closed cooling water system, the second auxiliary return header fluidly coupled to the first auxiliary return header of the first auxiliary cooling water system of the first modular cooling water assembly and providing auxiliary cooling water to the first auxiliary return header;
a second auxiliary supply header positioned adjacent the second auxiliary return header, the second auxiliary supply header fluidly coupled to the first auxiliary supply header of the first auxiliary cooling water system of the first modular cooling water assembly for receiving the auxiliary cooling water from the first auxiliary supply header; and
a second auxiliary cooling water circuit fluidly coupling the second auxiliary supply header to the second auxiliary return header, the second auxiliary cooling water circuit fluidly coupled to the second filter and the second heat exchanger.

18. The cooling water system of claim 10, further comprising:
a third modular cooling water assembly positioned adjacent and fluidly coupled to the second modular cool water assembly, the third modular cooling water assembly including:
a third support structure positioned adjacent the second support structure of the second modular cooling water assembly;
a third pump positioned on the third support structure;
a third heat exchanger positioned on the third support structure; and
a third closed cooling water system supported by the third support structure and in fluid communication with the second closed cooling water system of the second modular cooling water assembly, the third closed cooling water system including:
a third return header fluidly coupled to the second return header of the second closed cooling water system, the third return header receiving cooling water from the second return header;
a third supply header positioned adjacent the third return header, the third supply header fluidly coupled to the second supply header of the second closed cooling water system for supplying cooling water to the second supply header; and
a third closed cooling water circuit fluidly coupling the third return header to the third supply header, the third closed cooling water circuit fluidly coupled to the third heat exchanger and the third pump.

\* \* \* \* \*